United States Patent
Harris et al.

(10) Patent No.: US 10,817,513 B2
(45) Date of Patent: Oct. 27, 2020

(54) FAIR SCHEDULING FOR MIXED-QUERY LOADS

(71) Applicant: Palantir Technologies, Inc., Palo Alto, CA (US)

(72) Inventors: Michael Harris, Palo Alto, CA (US); John Carrino, Palo Alto, CA (US); Eric Wong, San Mateo, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 543 days.

(21) Appl. No.: 15/634,422

(22) Filed: Jun. 27, 2017

(65) Prior Publication Data

US 2017/0293653 A1 Oct. 12, 2017

Related U.S. Application Data

(63) Continuation of application No. 14/726,211, filed on May 29, 2015, now Pat. No. 9,715,526, which is a continuation of application No. 13/826,228, filed on Mar. 14, 2013, now Pat. No. 9,092,482.

(51) Int. Cl.
*G06F 16/2453* (2019.01)
*G06F 16/951* (2019.01)
*G06F 16/2455* (2019.01)

(52) U.S. Cl.
CPC .... *G06F 16/24535* (2019.01); *G06F 16/2453* (2019.01); *G06F 16/2455* (2019.01); *G06F 16/24542* (2019.01); *G06F 16/951* (2019.01)

(58) Field of Classification Search
CPC ......... G06F 16/24535; G06F 16/24542; G06F 16/2455; G06F 16/2453; G06F 16/951
See application file for complete search history.

(56) References Cited

U.S. PATENT DOCUMENTS

| | | |
|---|---|---|
| 5,109,399 A | 4/1992 | Thompson |
| 5,329,108 A | 7/1994 | Lamoure |
| 5,418,950 A | 5/1995 | Li et al. |

(Continued)

FOREIGN PATENT DOCUMENTS

| | | |
|---|---|---|
| AU | 2014206155 | 12/2015 |
| CN | 103324724 | 9/2013 |

(Continued)

OTHER PUBLICATIONS

The Apache Cassandra Project, dated 2009, 3 pages.

(Continued)

*Primary Examiner* — Jensen Hu
(74) *Attorney, Agent, or Firm* — Hickman Palermo Becker Bingham LLP; Adam C. Stone

(57) ABSTRACT

A fair scheduling system with methodology for scheduling queries for execution by a database management system in a fair manner. The system obtains query jobs for execution by the database management system and cost estimates to execute the query jobs. Based on the cost estimates, the system causes the database management system to execute the query jobs as separate sub-query tasks in a round-robin fashion. By doing so, the execution latency of low cost query jobs that return few results is reduced when the query jobs are concurrently executed with high cost query jobs that return many results.

21 Claims, 5 Drawing Sheets

(56) References Cited

U.S. PATENT DOCUMENTS

| | | |
|---|---|---|
| 5,428,737 A | 6/1995 | Li et al. |
| 5,428,776 A | 6/1995 | Rothfield |
| 5,542,089 A | 7/1996 | Lindsay et al. |
| 5,568,390 A | 10/1996 | Hirota et al. |
| 5,608,899 A | 3/1997 | Li et al. |
| 5,613,105 A | 3/1997 | Xbikowski et al. |
| 5,632,009 A | 5/1997 | Rao et al. |
| 5,670,987 A | 9/1997 | Doi et al. |
| 5,701,456 A | 12/1997 | Jacopi et al. |
| 5,724,575 A | 3/1998 | Hoover et al. |
| 5,781,704 A | 7/1998 | Rossmo |
| 5,794,228 A | 8/1998 | French et al. |
| 5,794,229 A | 8/1998 | French et al. |
| 5,798,769 A | 8/1998 | Chiu et al. |
| 5,845,300 A | 12/1998 | Comer |
| 5,857,329 A | 1/1999 | Bingham |
| 5,872,973 A | 2/1999 | Mitchell et al. |
| 5,897,636 A | 4/1999 | Kaeser |
| 5,902,349 A | 5/1999 | Endo et al. |
| 5,911,138 A | 6/1999 | Li et al. |
| 5,918,225 A | 6/1999 | White et al. |
| 6,057,757 A | 5/2000 | Arrowsmith et al. |
| 6,058,373 A | 5/2000 | Blinn |
| 6,073,129 A | 6/2000 | Levine et al. |
| 6,091,956 A | 7/2000 | Hollenberg |
| 6,094,653 A | 7/2000 | Li et al. |
| 6,161,098 A | 12/2000 | Wallman |
| 6,208,985 B1 | 3/2001 | Krehel |
| 6,219,053 B1 | 4/2001 | Tachibana et al. |
| 6,232,971 B1 | 5/2001 | Haynes |
| 6,236,994 B1 | 5/2001 | Swartz et al. |
| 6,243,717 B1 | 6/2001 | Gordon et al. |
| 6,247,019 B1 | 6/2001 | Davies |
| 6,279,018 B1 | 8/2001 | Kudrolli et al. |
| 6,289,334 B1 | 9/2001 | Reiner et al. |
| 6,304,873 B1 | 10/2001 | Klein et al. |
| 6,311,181 B1 | 10/2001 | Lee et al. |
| 6,321,274 B1 | 11/2001 | Shakib et al. |
| 6,341,310 B1 | 1/2002 | Leshem et al. |
| 6,366,933 B1 | 4/2002 | Ball et al. |
| 6,369,835 B1 | 4/2002 | Lin |
| 6,418,438 B1 | 7/2002 | Campbell |
| 6,446,062 B1 | 9/2002 | Levine et al. |
| 6,456,997 B1 | 9/2002 | Shukla |
| 6,496,774 B1 | 12/2002 | Davies |
| 6,510,504 B2 | 1/2003 | Satyanarayana |
| 6,549,752 B2 | 4/2003 | Tsukamoto |
| 6,549,944 B1 | 4/2003 | Weinberg et al. |
| 6,560,620 B1 | 5/2003 | Ching |
| 6,574,635 B2 | 6/2003 | Stauber et al. |
| 6,581,068 B1 | 6/2003 | Bensoussan et al. |
| 6,594,672 B1 | 7/2003 | Lampson et al. |
| 6,608,559 B1 | 8/2003 | Lemelson et al. |
| 6,631,496 B1 | 10/2003 | Li et al. |
| 6,640,231 B1 | 10/2003 | Andersen et al. |
| 6,642,945 B1 | 11/2003 | Sharpe |
| 6,643,613 B2 | 11/2003 | McGee et al. |
| 6,674,434 B1 | 1/2004 | Chojnacki et al. |
| 6,701,485 B1 | 3/2004 | Igra et al. |
| 6,714,936 B1 | 3/2004 | Nevin, III |
| 6,745,382 B1 | 6/2004 | Zothner |
| 6,775,675 B1 | 8/2004 | Nwabueze et al. |
| 6,779,151 B2 | 8/2004 | Cahill et al. |
| 6,820,135 B1 | 11/2004 | Dingman |
| 6,828,920 B2 | 12/2004 | Owen et al. |
| 6,839,745 B1 | 1/2005 | Dingari et al. |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,028,223 B1 | 4/2006 | Kolawa et al. |
| 7,036,085 B2 | 4/2006 | Barros |
| 7,043,702 B2 | 5/2006 | Chi et al. |
| 7,055,110 B2 | 5/2006 | Kupka et al. |
| 7,058,622 B1 | 6/2006 | Tedesco |
| 7,058,648 B1 | 6/2006 | Lightfoot et al. |
| 7,085,890 B2 | 8/2006 | Kashyap |
| 7,111,231 B1 | 9/2006 | Huck et al. |
| 7,139,800 B2 | 11/2006 | Bellotti et al. |
| 7,155,728 B1 | 12/2006 | Prabhu et al. |
| 7,158,797 B1 | 1/2007 | Jayaraman et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski |
| 7,194,680 B1 | 3/2007 | Roy et al. |
| 7,216,133 B2 | 5/2007 | Wu et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Joseph |
| 7,406,592 B1 | 7/2008 | Polyudov |
| 7,426,654 B2 | 9/2008 | Adams et al. |
| 7,451,397 B2 | 11/2008 | Weber et al. |
| 7,454,466 B2 | 11/2008 | Bellotti et al. |
| 7,461,158 B2 | 12/2008 | Rider et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,519,589 B2 | 4/2009 | Charnock et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,546,353 B2 | 6/2009 | Hesselink et al. |
| 7,558,677 B2 | 6/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,603,229 B2 | 10/2009 | Goldberg et al. |
| 7,610,290 B2 | 10/2009 | Kruy et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,489 B2 | 12/2009 | Schaeffer et al. |
| 7,627,812 B2 | 12/2009 | Chamberlain et al. |
| 7,634,717 B2 | 12/2009 | Chamberlain et al. |
| 7,685,109 B1 | 3/2010 | Ransil |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,760,969 B2 | 7/2010 | Silverbrook et al. |
| 7,761,407 B1 | 7/2010 | Stern |
| 7,770,100 B2 | 8/2010 | Chamberlain et al. |
| 7,783,679 B2 | 8/2010 | Bley |
| 7,805,457 B1 | 9/2010 | Viola et al. |
| 7,809,703 B2 | 10/2010 | Balabhadrapatruni et al. |
| 7,814,084 B2 | 10/2010 | Hallett et al. |
| 7,818,291 B2 | 10/2010 | Ferguson et al. |
| 7,818,658 B2 | 10/2010 | Chen |
| 7,853,573 B2 | 12/2010 | Warner et al. |
| 7,870,493 B2 | 1/2011 | Pall et al. |
| 7,877,421 B2 | 1/2011 | Berger et al. |
| 7,894,984 B2 | 2/2011 | Rasmussen et al. |
| 7,899,611 B2 | 3/2011 | Downs et al. |
| 7,908,521 B2 | 3/2011 | Sridharan et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |

(56) References Cited

U.S. PATENT DOCUMENTS

| | | |
|---|---|---|
| 7,962,848 B2 | 6/2011 | Bertram |
| 7,970,240 B1 | 6/2011 | Chao et al. |
| 7,971,150 B2 | 6/2011 | Raskutti et al. |
| 7,979,424 B2 | 7/2011 | Dettinger et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,041,714 B2 | 10/2011 | Aymeloglu et al. |
| 8,042,110 B1 | 10/2011 | Kawahara et al. |
| 8,046,283 B2 | 10/2011 | Burns |
| 8,073,857 B2 | 12/2011 | Sreekanth |
| 8,103,543 B1 | 1/2012 | Zwicky |
| 8,103,962 B2 | 1/2012 | Embley et al. |
| 8,108,138 B2 | 1/2012 | Bruce et al. |
| 8,112,425 B2 | 2/2012 | Baum et al. |
| 8,126,848 B2 | 2/2012 | Wagner |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,285,725 B2 | 10/2012 | Bayliss |
| 8,285,860 B2 | 10/2012 | McGuire |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,352,174 B2 | 1/2013 | Milstein et al. |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,417,409 B2 | 4/2013 | Bast et al. |
| 8,417,715 B1 | 4/2013 | Bruckhaus et al. |
| 8,429,194 B2 | 4/2013 | Aymeloglu et al. |
| 8,433,702 B1 | 4/2013 | Carrino et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,494,984 B2 | 7/2013 | Hwang et al. |
| 8,499,287 B2 | 7/2013 | Shafi et al. |
| 8,504,542 B2 | 8/2013 | Chang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,494 B1 | 10/2013 | Downing et al. |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,620,641 B2 | 12/2013 | Farnsworth et al. |
| 8,639,552 B1 | 1/2014 | Chen et al. |
| 8,646,080 B2 | 2/2014 | Williamson et al. |
| 8,639,757 B1 | 3/2014 | Adams et al. |
| 8,676,857 B1 | 3/2014 | Adams et al. |
| 8,688,069 B1 | 4/2014 | Cazanas et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,799,799 B1 | 5/2014 | Cervelli et al. |
| 8,742,934 B1 | 6/2014 | Sarpy et al. |
| 8,744,890 B1 | 6/2014 | Bernier |
| 8,745,516 B2 | 6/2014 | Mason et al. |
| 8,763,078 B1 | 6/2014 | Castellucci et al. |
| 8,781,169 B2 | 7/2014 | Jackson et al. |
| 8,786,605 B1 | 7/2014 | Curtis et al. |
| 8,787,939 B2 | 7/2014 | Papakipos et al. |
| 8,788,407 B1 | 7/2014 | Singh et al. |
| 8,799,867 B1 | 8/2014 | Peri-Glass et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,903,717 B2 | 12/2014 | Elliot |
| 8,904,477 B2 | 12/2014 | Barton |
| 8,909,597 B2 | 12/2014 | Aymeloglu et al. |
| 8,917,274 B2 | 12/2014 | Ma et al. |
| 8,924,429 B1 | 12/2014 | Fisher et al. |
| 8,924,872 B1 | 12/2014 | Bogomolov et al. |
| 8,930,331 B2 | 1/2015 | McGrew et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 8,954,410 B2 | 2/2015 | Chang et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,031,981 B1 | 5/2015 | Potter et al. |
| 9,043,696 B1 | 5/2015 | Meiklejohn et al. |
| 9,043,894 B1 | 5/2015 | Dennison et al. |
| 9,092,482 B2 | 7/2015 | Harris et al. |
| 9,105,000 B1 | 8/2015 | White et al. |
| 9,116,975 B2 | 8/2015 | Shankar et al. |
| 9,123,086 B1 | 9/2015 | Freeland et al. |
| 9,208,159 B2 | 12/2015 | Stowe et al. |
| 9,230,280 B1 | 1/2016 | Maag et al. |
| 9,256,657 B1 | 2/2016 | Evenson |
| 9,262,529 B2 | 2/2016 | Colgrove et al. |
| 9,275,069 B1 | 3/2016 | Garrod et al. |
| 9,280,532 B2 | 3/2016 | Cicerone |
| 9,292,388 B2 | 3/2016 | Fisher et al. |
| 9,301,103 B1 | 3/2016 | Thompson |
| 9,313,233 B2 | 4/2016 | Sprague et al. |
| 9,330,120 B2 | 5/2016 | Colgrove et al. |
| 9,348,677 B2 | 5/2016 | Marinelli, III et al. |
| 9,378,526 B2 | 6/2016 | Sampson |
| 9,380,431 B1 | 6/2016 | Freeland et al. |
| 9,521,194 B1 | 12/2016 | Gabrielson |
| 9,619,507 B2 | 4/2017 | Chang et al. |
| 9,621,767 B1 | 4/2017 | Sampson |
| 9,715,526 B2 | 7/2017 | Harris et al. |
| 9,880,993 B2 | 1/2018 | Cicerone |
| 9,906,623 B2 | 2/2018 | Sampson |
| 10,073,902 B2 | 9/2018 | Kotagiri |
| 10,430,240 B2 | 10/2019 | DeArment |
| 2001/0051949 A1 | 12/2001 | Carey et al. |
| 2001/0056522 A1 | 12/2001 | Satyanarayana |
| 2002/0033848 A1 | 3/2002 | Sciammarella et al. |
| 2002/0065708 A1 | 5/2002 | Senay et al. |
| 2002/0091694 A1 | 7/2002 | Hrle et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0156798 A1 | 10/2002 | LaRue et al. |
| 2002/0174201 A1 | 11/2002 | Ramer et al. |
| 2002/0184111 A1 | 12/2002 | Swanson |
| 2002/0194119 A1 | 12/2002 | Wright et al. |
| 2003/0004770 A1 | 1/2003 | Miller et al. |
| 2003/0023620 A1 | 1/2003 | Trotta |
| 2003/0028560 A1 | 2/2003 | Kudrolli et al. |
| 2003/0039948 A1 | 2/2003 | Donahue |
| 2003/0061211 A1 | 3/2003 | Shultz et al. |
| 2003/0105759 A1 | 6/2003 | Bess et al. |
| 2003/0105833 A1 | 6/2003 | Daniels |
| 2003/0115481 A1 | 6/2003 | Baird et al. |
| 2003/0120675 A1 | 6/2003 | Stauber et al. |

(56) References Cited

U.S. PATENT DOCUMENTS

| | | |
|---|---|---|
| 2003/0130993 A1 | 7/2003 | Mendelevitch et al. |
| 2003/0140106 A1 | 7/2003 | Raguseo |
| 2003/0144868 A1 | 7/2003 | MacIntyre et al. |
| 2003/0154328 A1* | 8/2003 | Henderson .............. H04L 69/16 710/1 |
| 2003/0163352 A1 | 8/2003 | Surpin et al. |
| 2003/0212670 A1 | 11/2003 | Yalamanchi et al. |
| 2003/0212718 A1 | 11/2003 | Tester |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0044727 A1 | 3/2004 | Abdelaziz |
| 2004/0064256 A1 | 4/2004 | Barinek et al. |
| 2004/0083466 A1 | 4/2004 | Dapp et al. |
| 2004/0085318 A1 | 5/2004 | Hassler et al. |
| 2004/0088177 A1 | 5/2004 | Travis et al. |
| 2004/0095349 A1 | 5/2004 | Bito et al. |
| 2004/0098731 A1 | 5/2004 | Demsey et al. |
| 2004/0103088 A1 | 5/2004 | Cragun et al. |
| 2004/0111410 A1 | 6/2004 | Burgoon et al. |
| 2004/0117345 A1 | 6/2004 | Bamford et al. |
| 2004/0117387 A1 | 6/2004 | Civetta et al. |
| 2004/0126840 A1 | 7/2004 | Cheng et al. |
| 2004/0139212 A1 | 7/2004 | Mukherjee et al. |
| 2004/0143602 A1 | 7/2004 | Ruiz et al. |
| 2004/0143796 A1 | 7/2004 | Lerner et al. |
| 2004/0148301 A1 | 7/2004 | McKay et al. |
| 2004/0153418 A1 | 8/2004 | Hanweck |
| 2004/0153837 A1 | 8/2004 | Preston et al. |
| 2004/0163039 A1 | 8/2004 | McPherson et al. |
| 2004/0167912 A1 | 8/2004 | Tsui |
| 2004/0193600 A1 | 9/2004 | Kaasten et al. |
| 2004/0193608 A1 | 9/2004 | Gollapudi et al. |
| 2004/0205524 A1 | 10/2004 | Richter et al. |
| 2004/0220923 A1 | 11/2004 | Nica |
| 2004/0221223 A1 | 11/2004 | Yu et al. |
| 2004/0236746 A1 | 11/2004 | Lomet |
| 2004/0254658 A1 | 12/2004 | Sherriff et al. |
| 2004/0260702 A1 | 12/2004 | Cragun et al. |
| 2004/0267746 A1 | 12/2004 | Marcjan et al. |
| 2005/0004911 A1 | 1/2005 | Goldberg et al. |
| 2005/0021397 A1 | 1/2005 | Cui et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0091420 A1 | 4/2005 | Snover et al. |
| 2005/0097441 A1 | 5/2005 | Herbach et al. |
| 2005/0108231 A1 | 5/2005 | Findleton et al. |
| 2005/0114763 A1 | 5/2005 | Nonomura et al. |
| 2005/0120080 A1 | 6/2005 | Weinreb et al. |
| 2005/0125436 A1 | 6/2005 | Mudunuri et al. |
| 2005/0125715 A1 | 6/2005 | Franco et al. |
| 2005/0131935 A1 | 6/2005 | O'Leary et al. |
| 2005/0143096 A1 | 6/2005 | Boesch |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0226473 A1 | 10/2005 | Ramesh |
| 2005/0246327 A1 | 11/2005 | Yeung et al. |
| 2005/0251786 A1 | 11/2005 | Citron et al. |
| 2005/0278286 A1 | 12/2005 | Djugash et al. |
| 2005/0283465 A1 | 12/2005 | Dettinger et al. |
| 2005/0289524 A1 | 12/2005 | McGinnes |
| 2006/0004740 A1 | 1/2006 | Dettinger et al. |
| 2006/0026120 A1 | 2/2006 | Carolan et al. |
| 2006/0026170 A1 | 2/2006 | Kreitler et al. |
| 2006/0036574 A1 | 2/2006 | Schweigkoffer et al. |
| 2006/0059139 A1 | 3/2006 | Robinson |
| 2006/0070046 A1 | 3/2006 | Balakrishnan et al. |
| 2006/0074881 A1 | 4/2006 | Vembu et al. |
| 2006/0074967 A1 | 4/2006 | Shaburov |
| 2006/0080316 A1 | 4/2006 | Gilmore et al. |
| 2006/0080616 A1 | 4/2006 | Vogel et al. |
| 2006/0080619 A1 | 4/2006 | Carlson et al. |
| 2006/0093222 A1 | 5/2006 | Saffer et al. |
| 2006/0095521 A1 | 5/2006 | Patinkin |
| 2006/0106847 A1 | 5/2006 | Eckardt et al. |
| 2006/0116991 A1 | 6/2006 | Calderwood |
| 2006/0129540 A1 | 6/2006 | Hillis et al. |
| 2006/0129746 A1 | 6/2006 | Porter |
| 2006/0129929 A1 | 6/2006 | Weber et al. |
| 2006/0129992 A1 | 6/2006 | Oberholtzer et al. |
| 2006/0136360 A1 | 6/2006 | Gebhart |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0149596 A1 | 7/2006 | Surpin et al. |
| 2006/0161558 A1 | 7/2006 | Tamma et al. |
| 2006/0161568 A1 | 7/2006 | Dettinger et al. |
| 2006/0203337 A1 | 9/2006 | White |
| 2006/0209085 A1 | 9/2006 | Wong et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0218637 A1 | 9/2006 | Thomas et al. |
| 2006/0241856 A1 | 10/2006 | Cobleigh et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2006/0271277 A1 | 11/2006 | Hu et al. |
| 2006/0271838 A1 | 11/2006 | Carro |
| 2006/0271884 A1 | 11/2006 | Hurst |
| 2006/0279630 A1 | 12/2006 | Aggarwal et al. |
| 2006/0288046 A1 | 12/2006 | Gupta et al. |
| 2006/0294301 A1* | 12/2006 | Zohar ................... G06F 3/0611 711/113 |
| 2007/0005582 A1 | 1/2007 | Navratil et al. |
| 2007/0005801 A1 | 1/2007 | Kumar |
| 2007/0011150 A1 | 1/2007 | Frank |
| 2007/0016363 A1 | 1/2007 | Huang et al. |
| 2007/0027851 A1 | 2/2007 | Kruy et al. |
| 2007/0038646 A1 | 2/2007 | Thota |
| 2007/0038962 A1 | 2/2007 | Fuchs et al. |
| 2007/0050328 A1 | 3/2007 | Li et al. |
| 2007/0050429 A1 | 3/2007 | Goldring et al. |
| 2007/0050702 A1 | 3/2007 | Chopin et al. |
| 2007/0057966 A1 | 3/2007 | Ohno et al. |
| 2007/0061487 A1 | 3/2007 | Moore et al. |
| 2007/0072591 A1 | 3/2007 | McGary et al. |
| 2007/0078832 A1 | 4/2007 | Ott et al. |
| 2007/0083541 A1 | 4/2007 | Fraleigh et al. |
| 2007/0088596 A1 | 4/2007 | Berkelhamer et al. |
| 2007/0094248 A1 | 4/2007 | McVeigh et al. |
| 2007/0094389 A1 | 4/2007 | Nussey et al. |
| 2007/0105597 A1 | 5/2007 | Hwang |
| 2007/0112714 A1 | 5/2007 | Fairweather |
| 2007/0113164 A1 | 5/2007 | Hansen et al. |
| 2007/0118547 A1 | 5/2007 | Gupta et al. |
| 2007/0143253 A1 | 6/2007 | Kostamaa et al. |
| 2007/0150369 A1 | 6/2007 | Zivin |
| 2007/0150805 A1 | 6/2007 | Misovski |
| 2007/0156698 A1 | 7/2007 | Gebhart |
| 2007/0168336 A1 | 7/2007 | Ransil et al. |
| 2007/0174760 A1 | 7/2007 | Chamberlain et al. |
| 2007/0178501 A1 | 8/2007 | Rabinowitz et al. |
| 2007/0185850 A1 | 8/2007 | Walters et al. |
| 2007/0192265 A1 | 8/2007 | Chopin et al. |
| 2007/0192281 A1 | 8/2007 | Cradick et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0220604 A1 | 9/2007 | Long |
| 2007/0226218 A1 | 9/2007 | Chatterjee et al. |
| 2007/0233709 A1 | 10/2007 | Abnous |
| 2007/0233756 A1 | 10/2007 | D'Souza et al. |

(56) References Cited

U.S. PATENT DOCUMENTS

| | | |
|---|---|---|
| 2007/0240062 A1 | 10/2007 | Christena et al. |
| 2007/0260582 A1 | 11/2007 | Liang |
| 2007/0266336 A1 | 11/2007 | Nojima et al. |
| 2007/0271317 A1 | 11/2007 | Carmel |
| 2007/0294643 A1 | 12/2007 | Kyle |
| 2007/0299697 A1 | 12/2007 | Friedlander et al. |
| 2007/0299814 A1 | 12/2007 | Barsness et al. |
| 2008/0015970 A1 | 1/2008 | Brookfield et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0104019 A1 | 5/2008 | Nath |
| 2008/0104060 A1 | 5/2008 | Abhyankar et al. |
| 2008/0104149 A1 | 5/2008 | Vishniac et al. |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0195417 A1 | 8/2008 | Surpin et al. |
| 2008/0195608 A1 | 8/2008 | Clover |
| 2008/0195672 A1 | 8/2008 | Hamel et al. |
| 2008/0196016 A1 | 8/2008 | Todd |
| 2008/0201313 A1 | 8/2008 | Dettinger et al. |
| 2008/0201339 A1 | 8/2008 | McGrew |
| 2008/0215543 A1 | 9/2008 | Huang et al. |
| 2008/0215546 A1 | 9/2008 | Baum et al. |
| 2008/0222295 A1 | 9/2008 | Robinson et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0267386 A1 | 10/2008 | Cooper |
| 2008/0270316 A1 | 10/2008 | Guidotti et al. |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301378 A1 | 12/2008 | Carrie |
| 2008/0301559 A1 | 12/2008 | Martinsen et al. |
| 2008/0301643 A1 | 12/2008 | Appleton et al. |
| 2008/0307139 A1 * | 12/2008 | Thomas .................. G06F 9/52 710/244 |
| 2008/0313281 A1 | 12/2008 | Scheidl et al. |
| 2009/0002492 A1 | 1/2009 | Velipasalar et al. |
| 2009/0006150 A1 | 1/2009 | Prigge et al. |
| 2009/0007056 A1 | 1/2009 | Prigge et al. |
| 2009/0027418 A1 | 1/2009 | Maru et al. |
| 2009/0030915 A1 | 1/2009 | Winter et al. |
| 2009/0031247 A1 | 1/2009 | Walter et al. |
| 2009/0037366 A1 | 2/2009 | Shankar et al. |
| 2009/0037417 A1 | 2/2009 | Shankar et al. |
| 2009/0037912 A1 | 2/2009 | Stoitsev et al. |
| 2009/0043762 A1 | 2/2009 | Shiverick et al. |
| 2009/0055251 A1 | 2/2009 | Shah et al. |
| 2009/0055487 A1 | 2/2009 | Moraes et al. |
| 2009/0083275 A1 | 3/2009 | Jacob et al. |
| 2009/0088964 A1 | 4/2009 | Schaaf et al. |
| 2009/0094217 A1 | 4/2009 | Dettinger et al. |
| 2009/0106242 A1 | 4/2009 | McGrew |
| 2009/0106308 A1 | 4/2009 | Killian et al. |
| 2009/0119309 A1 | 5/2009 | Gibson et al. |
| 2009/0125369 A1 | 5/2009 | Kloostra et al. |
| 2009/0125459 A1 | 5/2009 | Norton et al. |
| 2009/0132317 A1 | 5/2009 | Dholakia |
| 2009/0132710 A1 | 5/2009 | Pelley |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0144747 A1 | 6/2009 | Baker |
| 2009/0161147 A1 | 6/2009 | Klave |
| 2009/0164387 A1 | 6/2009 | Armstrong et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172669 A1 | 7/2009 | Bobak et al. |
| 2009/0172674 A1 | 7/2009 | Bobak et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187556 A1 | 7/2009 | Ross et al. |
| 2009/0193012 A1 | 7/2009 | Williams |
| 2009/0198899 A1 | 8/2009 | Revanuru |
| 2009/0199047 A1 | 8/2009 | Vaitheeswaran et al. |
| 2009/0204570 A1 | 8/2009 | Wong |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0222808 A1 | 9/2009 | Faus |
| 2009/0234720 A1 | 9/2009 | George et al. |
| 2009/0240664 A1 | 9/2009 | Dinker et al. |
| 2009/0248721 A1 | 10/2009 | Burton et al. |
| 2009/0249244 A1 | 10/2009 | Robinson et al. |
| 2009/0254971 A1 | 10/2009 | Herz |
| 2009/0271435 A1 | 10/2009 | Yako et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0299830 A1 | 12/2009 | West et al. |
| 2009/0313223 A1 | 12/2009 | Rantanen |
| 2009/0313311 A1 | 12/2009 | Hoffmann et al. |
| 2009/0319418 A1 | 12/2009 | Herz |
| 2010/0011098 A1 | 1/2010 | Sanborn |
| 2010/0011282 A1 | 1/2010 | Dollard et al. |
| 2010/0036831 A1 | 2/2010 | Vemuri et al. |
| 2010/0042922 A1 | 2/2010 | Bradateanu et al. |
| 2010/0049959 A1 | 2/2010 | Arcese |
| 2010/0057716 A1 | 3/2010 | Stefik et al. |
| 2010/0058212 A1 | 3/2010 | Belitz et al. |
| 2010/0070464 A1 | 3/2010 | Aymeloglu et al. |
| 2010/0070489 A1 | 3/2010 | Aymeloglu et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0073315 A1 | 3/2010 | Lee et al. |
| 2010/0076939 A1 | 3/2010 | Iwaki et al. |
| 2010/0082541 A1 | 4/2010 | Kottomtharayil |
| 2010/0082655 A1 | 4/2010 | Silberstein et al. |
| 2010/0082671 A1 | 4/2010 | Li et al. |
| 2010/0100963 A1 | 4/2010 | Mahaffey |
| 2010/0103124 A1 | 4/2010 | Kruzeniski et al. |
| 2010/0114817 A1 | 5/2010 | Broeder et al. |
| 2010/0114831 A1 | 5/2010 | Gilbert et al. |
| 2010/0114841 A1 | 5/2010 | Holenstein et al. |
| 2010/0114887 A1 | 5/2010 | Conway et al. |
| 2010/0121817 A1 | 5/2010 | Meyer et al. |
| 2010/0122152 A1 | 5/2010 | Chamberlain et al. |
| 2010/0131457 A1 | 5/2010 | Heimendinger |
| 2010/0138842 A1 | 6/2010 | Balko et al. |
| 2010/0145902 A1 | 6/2010 | Boyan et al. |
| 2010/0145909 A1 | 6/2010 | Ngo |
| 2010/0153397 A1 | 6/2010 | Barabas et al. |
| 2010/0161565 A1 | 6/2010 | Lee et al. |
| 2010/0161646 A1 | 6/2010 | Ceballos et al. |
| 2010/0161688 A1 | 6/2010 | Kesselman et al. |
| 2010/0162176 A1 | 6/2010 | Dunton |
| 2010/0162371 A1 | 6/2010 | Geil |
| 2010/0169376 A1 | 7/2010 | Chu |
| 2010/0169405 A1 | 7/2010 | Zhang |
| 2010/0173619 A1 | 7/2010 | Hua et al. |
| 2010/0186020 A1 | 7/2010 | Maddhirala |
| 2010/0191563 A1 | 7/2010 | Schlaifer et al. |
| 2010/0191705 A1 | 7/2010 | Barabas et al. |
| 2010/0191884 A1 | 7/2010 | Holenstein et al. |
| 2010/0198684 A1 | 8/2010 | Eraker et al. |
| 2010/0199167 A1 | 8/2010 | Uematsu et al. |
| 2010/0199225 A1 | 8/2010 | Coleman et al. |
| 2010/0205662 A1 | 8/2010 | Ibrahim et al. |
| 2010/0211550 A1 | 8/2010 | Daniello et al. |
| 2010/0211618 A1 | 8/2010 | Anderson et al. |
| 2010/0228812 A1 | 9/2010 | Uomini |

(56) References Cited

U.S. PATENT DOCUMENTS

| | | |
|---|---|---|
| 2010/0235525 A1 | 9/2010 | McGuire |
| 2010/0235606 A1 | 9/2010 | Oreland et al. |
| 2010/0250412 A1 | 9/2010 | Wagner |
| 2010/0257404 A1 | 10/2010 | Singh et al. |
| 2010/0280857 A1 | 11/2010 | Liu et al. |
| 2010/0281458 A1 | 11/2010 | Paladino et al. |
| 2010/0283787 A1 | 11/2010 | Hamedi et al. |
| 2010/0293174 A1 | 11/2010 | Bennett et al. |
| 2010/0306713 A1 | 12/2010 | Geisner et al. |
| 2010/0313119 A1 | 12/2010 | Baldwin et al. |
| 2010/0318503 A1 | 12/2010 | Romine et al. |
| 2010/0318838 A1 | 12/2010 | Katano et al. |
| 2010/0318858 A1 | 12/2010 | Essawi et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2010/0332448 A1 | 12/2010 | Holenstein et al. |
| 2011/0029498 A1 | 2/2011 | Ferguson et al. |
| 2011/0029526 A1 | 2/2011 | Knight et al. |
| 2011/0035396 A1 | 2/2011 | Merz et al. |
| 2011/0041084 A1 | 2/2011 | Karam |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0066497 A1 | 3/2011 | Gopinath et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0093440 A1 | 4/2011 | Asakura et al. |
| 2011/0093490 A1 | 4/2011 | Schindlauer et al. |
| 2011/0111786 A1 | 5/2011 | Rao |
| 2011/0117878 A1 | 5/2011 | Barash et al. |
| 2011/0119100 A1 | 5/2011 | Ruhl et al. |
| 2011/0131547 A1 | 6/2011 | Elaasar |
| 2011/0145401 A1 | 6/2011 | Westlake |
| 2011/0153384 A1 | 6/2011 | Horne et al. |
| 2011/0153592 A1 | 6/2011 | DeMarcken |
| 2011/0158248 A1* | 6/2011 | Vorunganti ............ H04L 47/20 370/412 |
| 2011/0161096 A1 | 6/2011 | Buehler et al. |
| 2011/0161132 A1 | 6/2011 | Goel et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173619 A1 | 7/2011 | Fish |
| 2011/0184813 A1 | 7/2011 | Barne et al. |
| 2011/0185316 A1 | 7/2011 | Reid et al. |
| 2011/0185401 A1 | 7/2011 | Bak et al. |
| 2011/0208724 A1 | 8/2011 | Jones et al. |
| 2011/0208822 A1 | 8/2011 | Rathod |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0238553 A1 | 9/2011 | Raj et al. |
| 2011/0251951 A1 | 10/2011 | Kolkowitz |
| 2011/0252282 A1 | 10/2011 | Meek et al. |
| 2011/0258158 A1 | 10/2011 | Resende et al. |
| 2011/0258216 A1 | 10/2011 | Supakkul et al. |
| 2011/0258242 A1 | 10/2011 | Eidson et al. |
| 2011/0270812 A1 | 11/2011 | Ruby |
| 2011/0270871 A1 | 11/2011 | He et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2011/0321008 A1 | 12/2011 | Jhoney et al. |
| 2012/0010812 A1 | 1/2012 | Thompson |
| 2012/0011207 A1 | 1/2012 | Morris |
| 2012/0013684 A1 | 1/2012 | Robertson et al. |
| 2012/0014560 A1 | 1/2012 | Obrador et al. |
| 2012/0015673 A1 | 1/2012 | Klassen et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0078595 A1 | 3/2012 | Balandin et al. |
| 2012/0079363 A1 | 3/2012 | Folting et al. |
| 2012/0084118 A1 | 4/2012 | Bai et al. |
| 2012/0101952 A1 | 4/2012 | Raleigh et al. |
| 2012/0102022 A1 | 4/2012 | Miranker et al. |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0124179 A1 | 5/2012 | Cappio et al. |
| 2012/0131512 A1 | 5/2012 | Takeuchi et al. |
| 2012/0136804 A1 | 5/2012 | Lucia |
| 2012/0137235 A1 | 5/2012 | Ts et al. |
| 2012/0144335 A1 | 6/2012 | Abeln et al. |
| 2012/0150791 A1 | 6/2012 | Willson |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0159449 A1 | 6/2012 | Arnold et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0174057 A1 | 7/2012 | Narendra et al. |
| 2012/0180002 A1 | 7/2012 | Campbell et al. |
| 2012/0188252 A1 | 7/2012 | Law |
| 2012/0196557 A1 | 8/2012 | Reich et al. |
| 2012/0196558 A1 | 8/2012 | Reich et al. |
| 2012/0203708 A1 | 8/2012 | Psota et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0277914 A1 | 11/2012 | Crow et al. |
| 2012/0284345 A1 | 11/2012 | Costenaro et al. |
| 2012/0284719 A1 | 11/2012 | Phan et al. |
| 2012/0290506 A1 | 11/2012 | Muramatsu et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0316845 A1* | 12/2012 | Grey ............... G06Q 10/06398 703/2 |
| 2012/0323888 A1 | 12/2012 | Osann, Jr. |
| 2012/0330908 A1 | 12/2012 | Stowe et al. |
| 2012/0330973 A1 | 12/2012 | Ghuneim et al. |
| 2013/0005362 A1 | 1/2013 | Borghei |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0013642 A1 | 1/2013 | Klein et al. |
| 2013/0018796 A1 | 1/2013 | Kolhatkar et al. |
| 2013/0024268 A1 | 1/2013 | Manickavelu |
| 2013/0024731 A1 | 1/2013 | Shochat et al. |
| 2013/0036346 A1 | 2/2013 | Cicerone |
| 2013/0046635 A1 | 2/2013 | Grigg et al. |
| 2013/0046842 A1 | 2/2013 | Muntz et al. |
| 2013/0054551 A1 | 2/2013 | Lange |
| 2013/0060742 A1 | 3/2013 | Chang et al. |
| 2013/0060786 A1 | 3/2013 | Serrano et al. |
| 2013/0061169 A1 | 3/2013 | Pearcy et al. |
| 2013/0070917 A1 | 3/2013 | Nuestro |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0091084 A1 | 4/2013 | Lee |
| 2013/0096968 A1 | 4/2013 | Van Pelt et al. |
| 2013/0097130 A1 | 4/2013 | Bingol et al. |

(56) References Cited

U.S. PATENT DOCUMENTS

| | | |
|---|---|---|
| 2013/0097482 A1 | 4/2013 | Marantz et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0101159 A1 | 6/2013 | Rosen |
| 2013/0143597 A1 | 6/2013 | Mitsuya et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0157234 A1 | 6/2013 | Gulli et al. |
| 2013/0165069 A1 | 6/2013 | Nitta et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0198624 A1 | 8/2013 | Aymeloglu et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226944 A1 | 8/2013 | Baid et al. |
| 2013/0226953 A1 | 8/2013 | Markovich et al. |
| 2013/0231862 A1 | 9/2013 | Delling et al. |
| 2013/0232045 A1 | 9/2013 | Tai |
| 2013/0232220 A1 | 9/2013 | Sampson |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0283097 A1* | 10/2013 | Chen ............... G06F 9/5027 714/16 |
| 2013/0286601 A1 | 10/2013 | Shin et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0304770 A1 | 11/2013 | Boero et al. |
| 2013/0311375 A1 | 11/2013 | Priebatsch |
| 2013/0318060 A1 | 11/2013 | Chang et al. |
| 2013/0326537 A1* | 12/2013 | Edelstein ............ G06F 9/4881 718/106 |
| 2014/0012886 A1 | 1/2014 | Downing et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0074888 A1 | 3/2014 | Potter et al. |
| 2014/0079340 A1 | 3/2014 | Kawano |
| 2014/0081685 A1 | 3/2014 | Thacker et al. |
| 2014/0093174 A1 | 4/2014 | Zhang et al. |
| 2014/0095273 A1 | 4/2014 | Tang et al. |
| 2014/0095509 A1 | 4/2014 | Patton |
| 2014/0095540 A1 | 4/2014 | Hsiao et al. |
| 2014/0108068 A1 | 4/2014 | Williams |
| 2014/0108074 A1 | 4/2014 | Miller et al. |
| 2014/0108380 A1 | 4/2014 | Gotz et al. |
| 2014/0108985 A1 | 4/2014 | Scott et al. |
| 2014/0115589 A1 | 4/2014 | Marinelli, III et al. |
| 2014/0115610 A1 | 4/2014 | Marinelli, III et al. |
| 2014/0129261 A1 | 5/2014 | Bothwell et al. |
| 2014/0149272 A1 | 5/2014 | Hirani et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0176606 A1 | 6/2014 | Narayan et al. |
| 2014/0181833 A1 | 6/2014 | Bird et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0222521 A1 | 8/2014 | Chait |
| 2014/0244388 A1 | 8/2014 | Manouchehri et al. |
| 2014/0267294 A1 | 9/2014 | Ma |
| 2014/0267295 A1 | 9/2014 | Sharma |
| 2014/0279824 A1 | 9/2014 | Tamayo |
| 2014/0310266 A1 | 10/2014 | Greenfield |
| 2014/0316911 A1 | 10/2014 | Gross |
| 2014/0324876 A1 | 10/2014 | Konik et al. |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0344231 A1 | 11/2014 | Stowe et al. |
| 2015/0005014 A1 | 1/2015 | Huang et al. |
| 2015/0019394 A1 | 1/2015 | Unser et al. |
| 2015/0039886 A1 | 2/2015 | Kahol et al. |
| 2015/0046870 A1 | 2/2015 | Goldenberg et al. |
| 2015/0089353 A1 | 3/2015 | Folkening |
| 2015/0089424 A1 | 3/2015 | Duffield et al. |
| 2015/0100559 A1 | 4/2015 | Nassar |
| 2015/0100897 A1 | 4/2015 | Sun et al. |
| 2015/0100907 A1 | 4/2015 | Erenrich et al. |
| 2015/0106347 A1 | 4/2015 | McGrew et al. |
| 2015/0112641 A1 | 4/2015 | Faraj |
| 2015/0112956 A1 | 4/2015 | Chang et al. |
| 2015/0120176 A1 | 4/2015 | Curtis et al. |
| 2015/0134666 A1 | 5/2015 | Gattiker et al. |
| 2015/0142766 A1 | 5/2015 | Jain et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0172412 A1 | 6/2015 | Escriva |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0261817 A1 | 9/2015 | Harris et al. |
| 2015/0269030 A1 | 9/2015 | Fisher et al. |
| 2015/0331919 A1 | 11/2015 | Freeland et al. |
| 2015/0341467 A1 | 11/2015 | Lim et al. |
| 2016/0026923 A1 | 1/2016 | Erenrich et al. |
| 2016/0034545 A1 | 2/2016 | Shankar et al. |
| 2016/0062555 A1 | 3/2016 | Ward et al. |
| 2016/0094620 A1 | 3/2016 | Darling |
| 2016/0147730 A1 | 5/2016 | Cicerone |
| 2016/0218963 A1 | 7/2016 | Nauck |
| 2017/0075711 A1 | 3/2017 | Berrange |
| 2017/0171348 A1 | 6/2017 | Sampson |
| 2017/0285982 A1 | 10/2017 | De Arment |
| 2018/0343317 A1 | 11/2018 | Lakunishok |
| 2019/0354405 A1 | 11/2019 | DeArment |

FOREIGN PATENT DOCUMENTS

| | | |
|---|---|---|
| CN | 2807899 | 7/2017 |
| DE | 102014103482 | 9/2014 |
| DE | 102014215621 | 2/2015 |
| EP | 0652513 | 5/1995 |
| EP | 1647908 | 4/2006 |
| EP | 1672527 | 6/2006 |
| EP | 1926074 | 5/2008 |
| EP | 2551799 | 1/2013 |
| EP | 2555126 | 2/2013 |
| EP | 2560134 | 2/2013 |
| EP | 2 634 745 | 9/2013 |
| EP | 2743839 | 6/2014 |
| EP | 2778977 | 9/2014 |
| EP | 2778986 | 9/2014 |
| EP | 2835745 | 2/2015 |
| EP | 2835770 | 2/2015 |

(56) References Cited

FOREIGN PATENT DOCUMENTS

| | | |
|---|---|---|
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2876587 | 5/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2916276 | 9/2015 |
| EP | 2921975 | 9/2015 |
| EP | 2993595 | 3/2016 |
| EP | 2634745 | 5/2017 |
| GB | 2366498 | 3/2002 |
| GB | 2508503 | 1/2015 |
| GB | 2516155 | 1/2015 |
| GB | 2508293 | 4/2015 |
| GB | 2518745 | 4/2015 |
| HK | 1194178 | 9/2015 |
| HK | 1188321 | 4/2018 |
| NL | 2012778 | 11/2014 |
| NL | 2013306 | 2/2015 |
| NZ | 624557 | 12/2014 |
| NZ | 622485 | 3/2015 |
| NZ | 616212 | 5/2015 |
| NZ | 616299 | 7/2015 |
| WO | WO 2000/009529 | 2/2000 |
| WO | WO 2000/034895 | 6/2000 |
| WO | WO 2002/065353 | 8/2002 |
| WO | WO 2004/038548 | 5/2004 |
| WO | WO 2005/104736 | 11/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/030917 | 3/2010 |
| WO | WO 2012/025915 | 3/2012 |
| WO | WO 2013/010157 | 1/2013 |
| WO | WO 2013/030595 | 3/2013 |
| WO | WO 2013/0102892 | 7/2013 |

OTHER PUBLICATIONS

Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.
Official Communication for European Patent Application No. 151832721.8 dated Nov. 23, 2015, 8 pages.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for European Patent Application No. 14158861.6 dated Jun. 16, 2014.
Official Communication for European Patent Application No. 14159464.8 dated Jul. 31, 2014.
Official Communication for New Zealand Patent Application No. 627962 dated Aug. 5, 2014.
Official Communication for New Zealand Patent Application No. 628263 dated Aug. 12, 2014.
Official Communication for Great Britain Patent Application No. 1404457.2 dated Aug. 14, 2014.
Official Communication in New Zealand Patent Application No. 628495 dated Aug. 19, 2014.
Official Communication for New Zealand Patent Application No. 628161 dated Aug. 25, 2014.
Official Communication for New Zealand Patent Application No. 628585 dated Aug. 26, 2014.
Official Communication for New Zealand Patent Application No. 628840 dated Aug. 28, 2014.
Official Communication for European Patent Application No. 14159464.8 dated Sep. 22, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for European Patent Application No. 14180281.9 dated Jan. 26, 2015.
Official Communication for Great Britain Patent Application No. 1413935.6 dated Jan. 27, 2015.
Official Communication for European Patent Application No. 14180142.3 dated Feb. 6, 2015.
Official Communication for European Patent Application No. 14187996.5 dated Feb. 12, 2015.
Official Communication for European Patent Application No. 14186225.0 dated Feb. 13, 2015.
Official Communication for Australian Patent Application No. 2014201511 dated Feb. 27, 2015.
Official Communication for European Patent Application No. 14189347.9 dated Mar. 4, 2015.
Official Communication for Australian Patent Application No. 2014202442 dated Mar. 19, 2015.
Official Communication for European Patent Application No. 14180321.3 dated Apr. 17, 2015.
Official Communication for Netherlands Patent Application No. 2013306 dated Apr. 24, 2015.
Official Communication for European Patent Application No. 14197879.1 dated Apr. 28, 2015.
Official Communication for European Patent Application No. 14197895.7 dated Apr. 28, 2015.
Official Communication for Australian Patent Application No. 2014213553 dated May 7, 2015.
Official Communication for European Patent Application No. 14189802.3 dated May 11, 2015.
Official Communication for European Patent Application No. 14191540.5 dated May 27, 2015.
Official Communication for Australian Patent Application No. 2014210604 dated Jun. 5, 2015.
Official Communication for Australian Patent Application No. 2014250678 dated Jun. 17, 2015.
Official Communication for European Patent Application No. 14180432.8 dated Jun. 23, 2015.
Palmas et al., "An Edge-Bunding Layout for Interactive Parallel Coordinates" 2014 IEEE Pacific Visualization Symposium, pp. 57-64.
Map of San Jose, CA. Retrieved Oct. 2, 2013 from http://maps.bing.com.
Griffith, Daniel A., "A Generalized Huff Model," Geographical Analysis, Apr. 1982, vol. 14, No. 2, pp. 135-144.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-c553-ui-20120117/#resizing-amp-overflow retrieved on May 18, 2015.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
GIS-NET 3 Public—Department of Regional Planning. Planning & Zoning Information for UNINCORPORATED LA County. Retrieved Oct. 2, 2013 from http://gis.planning.lacounty.gov/GIS-NET3_Public/Viewer.html.
Definition "Overlay" downloaded Jan. 22, 2015, 1 page.
Manno et al., "Introducing Collaboration in Single-user Applications through the Centralized Control Architecture," 2010, pp. 10.
Keylines.com, "KeyLines Datasheet," Mar. 2014, <http://keylines.com/wp-content/uploads/2014/03/KeyLines-datasheet.pdf> downloaded May 12, 2014 in 2 pages.

(56) References Cited

OTHER PUBLICATIONS

Hibbert et al., "Prediction of Shopping Behavior Using a Huff Model Within a GIS Framework," Healthy Eating in Context, Mar. 18, 2011, pp. 16.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Hansen et al. "Analyzing Social Media Networks with NodeXL: Insights from a Connected World", Chapter 4, pp. 53-67 and Chapter 10, pp. 143-164, published Sep. 2010.
Thompson, Mick, "Getting Started with GEO," Getting Started with GEO, Jul. 26, 2011.
Rouse, Margaret, "OLAP Cube," <http://searchdatamanagement.techtarget.com/definition/OLAP-cube>, Apr. 28, 2012, pp. 16.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Umagandhi et al., "Search Query Recommendations Using Hybrid User Profile with Query Logs," International Journal of Computer Applications, vol. 80, No. 10, Oct. 1, 2013, pp. 7-18.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Goswami, Gautam, "Quite Writly Said!," One Brick at a Time, Aug. 21, 2005, pp. 7.
Conner, Nancy, "Google Apps: The Missing Manual," May 1, 2008, pp. 15.
A Word About Banks and the Laundering of Drug Money, Aug. 18, 2012, http://www.golemxiv.co.uk/2012/08/a-word-about-banks-and-the-laundering-of-drug-money/.
Boyce, Jim, "Microsoft Outlook 2010 Inside Out," Aug. 1, 2010, retrieved from the internet https://capdtron.files.wordpress.com/2013/01/outlook-2010-inside_out.pdf.
Huff et al., "Calibrating the Huff Model Using ArcGIS Business Analyst," ESRI, Sep. 2008, pp. 33.
Acklen, Laura, "Absolute Beginner's Guide to Microsoft Word 2003," Dec. 24, 2003, pp. 15-18, 34-41, 308-316.
Huff, David L., "Parameter Estimation in the Huff Model," ESRI, ArcUser, Oct.-Dec. 2003, pp. 34-36.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Kokossi et al., "D7-Dynamic Ontoloty Management System (Design)," Information Societies Technology Programme, Jan. 10, 2002, pp. 1-27.
Map of San Jose, CA. Retrieved Oct. 2, 2013 from http://maps.google.com.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Manske, "File Saving Dialogs," <http://www.mozilla.org/editor/ui_specs/FileSaveDialogs.html>, Jan. 20, 1999, pp. 7.
Huang et al., "Systematic and Integrative Analysis of Large Gene Lists Using DAVID Bioinformatics Resources," Nature Protocols, 4.1, 2008, 44-57.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Li et al., "Interactive Multimodal Visual Search on Mobile Device," IEEE Transactions on Multimedia, vol. 15, No. 3, Apr. 1, 2013, pp. 594-607.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
"A First Look: Predicting Market Demand for Food Retail using a Huff Analysis," TRF Policy Solutions, Jul. 2012, pp. 30.
Definition "Identify" downloaded Jan. 22, 2015, 1 page.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Map of San Jose, CA. Retrieved Oct. 2, 2013 from http://maps.yahoo.com.
Microsoft Office—Visio, "About connecting shapes," <http://office.microsoft.com/en-us/visio-help/about-connecting-shapes-HP085050369.aspx> printed Aug. 4, 2011 in 6 pages.
Bogle, Philip, "Reducing Cross Domain Call Overhead Using Batched Futures", Massachusetts Institute of Technology, dated May 1994, pp. 59-69.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
Official Communication for European Patent Application No. 15155846.7 dated Jul. 8, 2015.
Official Communication for Great Britain Patent Application No. 1404553.8 dated Sep. 9, 2014.
Official Communication for European Patent Application No. 14159464.8 dated Oct. 8, 2014.
Official Communication for European Patent Application No. 151832721.8 dated Nov. 23, 2015.
European Patent Office, "Search Report" in application No. 17 178 290.7-1221, dated Nov. 11, 2018, 7 pages.
European Claims in application No. 17 178 290.7-1221, dated Nov. 2018, 2 pages.
Panagiotis et al., "ACaZoo: A Distributed Key-Vale Store Based on Replicated LSM-Trees", IEEE, dated Oct. 8, 2014, 10 pages.
The Apache Cassandra Project.
Official Communication for European Patent Application No. 14159629.6 dated Jul. 31, 2014.
Canese et al., "Chapter 2: PubMed: The Bibliographic Database," The NCBI Handbook, Oct. 2002, pp. 1-10.
Ballesteros et al., "Batching: A Design Pattern for Efficient and Flexible Client/Server Interaction," Transactions on Pattern Languages of Programming, Springer Berlin Heildeberg, 2009, pp. 48-66.
Official Communication for Australian Patent Application No. 2014201580 dated Feb. 27, 2015.

(56) References Cited

OTHER PUBLICATIONS

Official Communication for New Zealand Patent Application No. 622485 dated Nov. 21, 2014.
Official Communication for New Zealand Patent Application No. 616299 dated Jan. 26, 2015.
Official Communication for European Patent Application No. 14159175.0 dated Feb. 4, 2016.
Sirotkin et al., "Chapter 13: The Processing of Biological Sequence Data at NCBI," The NCBI Handbook, Oct. 2002, pp. 1-11.
Han et al., "Efficient Computation of Iceberg Cubes with Complex Measures," ACM Sigmod, May 21-24, 2001, pp. 1-12.
Official Communication for New Zealand Patent Application No. 622414 dated Mar. 24, 2014.
Smart et al., "A Visual Approach to Semantic Query Design Using a Web-Based Graphical Query Designer," 16th International Conference on Knowledge Engineering and Knowledge Management (EKAW 2008),ÊAcitrezza, Catania, Italy, Sep. 29-Oct. 3, 2008.
Delcher et al., "Identifying Bacterial Genes and Endosymbiont DNA with Glimmer," Biolnformatics, vol. 23, No. 6, 2007, pp. 673-679.
Mendes et al., "TcruziKB: Enabling Complex Queries for Genomic Data Exploration," IEEE International Conference on Semantic Computing, Aug. 2008, pp. 432-439.
Alur et al., "Chapter 2: IBM InfoSphere DataStage Stages," IBM InfoSphere DataStage Data Flow and Job Design, Jul. 1, 2008, pp. 35-137.
Official Communication for Canadian Patent Application No. 2807899 dated Oct. 24, 2014.
Mizrachi, Ilene, "Chapter 1: Gen Bank: The Nuckeotide Sequence Database," The NCBI Handbook, Oct. 2002, pp. 1-14.
"A Tour of Pinboard," <http://pinboard.in/tour> as printed May 15, 2014 in 6 pages.
Goldstein et al., "Stacks Lazy Threads: Implementing a Fast Parallel Call," Journal of Parallel and Distributed Computing, Jan. 1, 1996, pp. 5-20.
Liu et al., "Methods for Mining Frequent Items in Data Streams: An Overview," Knowledge and Information Systems, vol. 26, No. 1, Jan. 2011, pp. 1-30.
Wikipedia, "Machine Code", p. 1-5, printed Aug. 11, 2014.
Official Communication for Great Britain Patent Application No. 1404574.4 dated Dec. 18, 2014.
Official Communication for Netherlands Patent Application No. 2012437 dated Sep. 18, 2015.
Official Communication for New Zealand Patent Application No. 622484 dated Apr. 2, 2014.
Kitts, Paul, "Chapter 14: Genome Assembly and Annotation Process," The NCBI Handbook, Oct. 2002, pp. 1-21.
"A Quick Guide to UniProtKB Swiss-Prot & TrEMBL," Sep. 2011, pp. 2.
Notice of Acceptance for New Zealand Patent Application No. 616299 dated Apr. 7, 2015.
Bogle et al., "Reducing Cross-Domain Call Overhead Using Batched Futures," SIGPLAN No. 29, 10 (Oct. 1994) pp. 341-354.
Official Communication for Canadian Patent Application No. 2828264 dated Apr. 28, 2015.
Official Communication for Australian Patent Application No. 2013237710 dated Jan. 16, 2015.
Official Communication for German Patent Application No. 10 2013 221 052.3 dated Mar. 24, 2015.
Niepert et al., "A Dynamic Ontology for a Dynamic Reference Work", Joint Conference on Digital Libraries, pp. 1-10, Vancouver, British Columbia, Jun. 17-22, 2007.
Official Communication for European Patent Application No. 13157474.1 dated Oct. 30, 2015.
Notice of Acceptance for New Zealand Patent Application No. 616212 dated Jan. 23, 2015.
Anonymous, "Frequently Asked Questions about Office Binder 97," http://web.archive.org/web/20100210112922/http://support.microsoft.com/kb/843147 printed Dec. 18, 2006 in 5 pages.

"The FASTA Program Package," fasta-36.3.4, Mar. 25, 2011, pp. 29.
Russell et al., "NITELIGHT: A Graphical Tool for Semantic Query Construction," 2008, pp. 10.
Karp et al., "A Simple Algorithm for Finding Frequent Elements in Streams and Bags," ACM Transactions on Database Systems, vol. 28, No. 1, Mar. 2003, pp. 51D55.
Stamos et al., "Remote Evaluation," Journal ACM Transactions on Programming Languages and Systems (TOPLAS) vol. 12, Issue 4, Oct. 1990, pp. 537-564.
Official Communication for European Patent Application No. 14159175.0 dated Jul. 17, 2014.
Official Communication for Netherlands Patent Application No. 2011613 dated Aug. 13, 2015.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-.
Official Communication for European Patent Application No. 15159520.4 dated Jul. 15, 2015.
Bae et al., "Partitioning Algorithms for the Computation of Average Iceberg Queries," DaWaK 2000, LNCS 1874, pp. 276_286.
Wollrath et al., "A Distributed Object Model for the Java System," Proceedings of the 2nd Conference on USENEX, Conference on Object-Oriented Technologies (COOTS), Jun. 17, 1996, pp. 219-231.
Madden, Tom, "Chapter 16: The BLAST Sequence Analysis Tool," The NCBI Handbook, Oct. 2002, pp. 1-15.
Notice of Acceptance for New Zealand Patent Application No. 622485 dated Nov. 24, 2014.
Official Communication for Netherlands Patent Application No. 2011627 dated Aug. 14, 2015.
Official Communication for German Patent Application No. 10 2013 221 057.4 dated Mar. 23, 2015.
Official Communication for European Patent Application No. 14159629.6 dated Sep. 22, 2014.
Fang et al., "Computing Iceberg Queries Efficiently," Proceedings of the 24th VLDB Conference New York, 1998, pp. 299-310.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Donjerkovic et al., "Probabilistic Optimization of Top N Queries," Proceedings of the 25th VLDB Conference, Edinburgh, Scotland, 1999, pp. 411-422.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Official Communication for Australian Patent Application No. 2013237658 dated Feb. 2, 2015.
Ivanova et al., "An Architecture for Recycling Intermediates in a Column-Store," Proceedings of the 35th Sigmod International Conference on Management of Data, Sigmod '09, Jun. 29, 2009, p. 309.
Leela et al., "On Incorporating Iceberg Queries in Query Processors," Technical Report, TR-2002-01, Database Systems for Advanced Applications Lecture Notes in Computer Science, 2004, vol. 2973.
Official Communication for Canadian Patent Application No. 2807899 dated Jul. 20, 2015.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Official Communication for Canadian Patent Application No. 2829266 dated Apr. 28, 2015.
Official Communication for European Patent Application No. 14162372.8 dated Apr. 30, 2015.
Official Communication for European Patent Application No. 12179096.8 dated Jul. 3, 2014.

(56) References Cited

OTHER PUBLICATIONS

Wollrath et al., "A Distributed Object Model for the Java System", Conference on Object-Oriented Technologies and Systems, pp. 219-231, Jun. 17-21, 1996.
Vose et al., "Help File for ModelRisk Version 5," 2007, Vose Software, pp. 349-353. [Uploaded in 2 Parts].
Jotshi et al., "Dispatching and Routing of Emergency Vehicles in Disaster Mitigation Using Data Fusion." Socio-Economic Planning Sciences, Pergamon, Amsterdam, Netherlands, vol. 43, No. 1, Mar. 1, 2009, 24 pages.
Official Communication for European Patent Application No. 12179096.8 dated Apr. 26, 2017.
Official Communication for New Zealand Patent Application No. 623323 dated Apr. 17, 2014.
Mohring et al., "Partitioning Graphs to Speedup Dijkstra's Algorithm," ACM Journal of Experimental Algorithmics, Association of Computing Machinery, New York, New York, vol. 11, Jan. 1, 2006, 29 pages.
Yang et al., "HTML Page Analysis Based on Visual Cues", A129, pp. 859-864, 2001.
Bernstein et al., "Hyder—A Transactional Record Manager for Shared Flash", 5th Biennial Conference on Innovative Data Systems Research (CIDR '11), vol. 12, Asilomar, California, Jan. 9-12, 2011.
Official Communication for European Patent Application No. 09813700.3 dated Apr. 3, 2014.
Anonymous, "BackTult—JD Edwards One World Version Control System," printed Jul. 23, 2007 in 1 page.
Official Communication for Great Britain Patent Application No. 1404553.8 dated Sep. 4, 2014.
"E-Mail Relay," <http://web.archive.org/web/20080821175021/http://emailrelay.sourceforge.net/> Aug. 21, 2008, pp. 2.
Baker et al., "Megastore: Providing Scalable, Highly Available Storage for Interactive Services", 5th Biennial Conference on Innovative Data Systems Research (CIDR '11), Asilomar, California, Jan. 9-12, 2011.
Delicious, <http://delicious.com/> as printed May 15, 2014 in 1 page.
Ashraf, "Protect your Google Account (Gmail) by enabling SMS (text message) notifications for Suspicious Activity," online article from dotTech, Jan. 24, 2013, https://dottech.org/94405/how-to-setup-text-message-sms-google-notifications-for-suspicious-activity/.
Kokossi et al., "D7-Dynamic Ontology Management System (Design)", Information Societies Technology Programme, pp. 1-27.
Official Communication for New Zealand Patent Application No. 623323 dated Jun. 6, 2014.
Official Communication for Canadian Patent Application No. 2846414 dated Apr. 13, 2016.
Wagner et al., "Dynamic Shortest Paths Containers," Electronic Notes in Theoretical Computer Science, vol. 92, No. 1, 2003, pp. 1-19.
Antoshenkov, Gennady, "Dictionary-Based Order-Preserving String Compression", The VLDB Journal, pp. 26-39, 1997.
Official Communication for European Patent Application No. 13157474.1 dated Apr. 29, 2016.
Yang et al., "An Enhanced Routing Method with Dijkstra Algorithm and AHP Analysis in GIS-based Emergency Plan," Geoinformatics, 2010 18th International Conference on, IEEE, Piscataway, New Jersey, Jun. 18, 2010, 6 pages.
Official Communication for European Patent Application No. 12182274.6 dated Jul. 25, 2017.
Official Communication for Canadian Patent Application No. 2828264 dated Apr. 11, 2016.
Frantisek et al., "An Architectural View of Distributed Objects and Components in CORBA, Java RMI and COM/DCOM," Software—Concepts & Tools, vol. 19, No. 1, Jun. 1, 1998, pp. 14-28.
Devanbu et al., "Authentic Third-party Data Publication", http://www.cs.ucdavis.edu/~devanbu/authdbpub.pdf, p. 19, 2000.

Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.
Hogue et al., "Thresher: Automating the Unwrapping of Semantic Content from the World Wide Web", 14th International Conference on World Wide Web, WWW 2005: Chiba, Japan, May 10-14, 2005.
Official Communication for Netherlands Patent Application No. 2012436 dated Nov. 6, 2015.
Official Communication for European Patent Application No. 12182274.6 dated Nov. 5, 2012.
Official Communication for European Patent Application No. 14199182.8 dated Mar. 13, 2015.
Anonymous, "BackTult—JD Edwards One World Version Control System", in 1 page, Jul. 23, 2007.
Hart et al., "A Formal Basis for the Heuristic Determination of Minimum Cost Paths," IEEE Transactions on Systems Science and Cybernetics, IEEE, vol. 1, No. 2, Jul. 1, 1968, pp. 100-107.
Official Communication for European Patent Application No. 14159464.8 dated Feb. 18, 2016.
Quest, "Toad for ORACLE 11.6—Guide to Using Toad", pp. 1-162, Sep. 24, 2012.
Official Communication for Canadian Patent Application No. 2,807,899 dated Jun. 14, 2016.
Official Communication for Canadian Patent Application No. 2829266 dated Apr. 1, 2016.
Chen et al., "A Novel Emergency Vehicle Dispatching System," 2013 IEEE 77th Vehicular Technology Conference, IEEE, Jun. 2, 2013, 5 pages.
"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.
Elmasri et al., "Fundamentals of Database Systems", Fourth Edition, pp. 455-491, 2004.
Nierman, "Evaluating Structural Similarity in XML Documents", 6 pages, 2002.
Miklau et al., "Securing History: Privacy and Accountability in Database Systems", 3rd Biennial Conference on Innovative Data Systems Research (CIDR), pp. 387-396, Asilomar, California, Jan. 7-10, 2007.
Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.
Dreyer et al., "An Object-Oriented Data Model for a Time Series Management System", Proceedings of the 7th International Working Conference on Scientific and Statistical Database Management, p. 12, Charlottesville, Virginia, USA, Sep. 28-30, 1994.
Klemmer et al., "Where Do Web Sites Come From? Capturing and Interacting with Design History," Association for Computing Machinery, CHI 2002, Apr. 20-25, 2002, Minneapolis, MN, pp. 8.
Eklund et al., "A Dynamic Multi-source Dijkstra's Algorithm for Vehicle Routing," Intelligent Information Systems, 1996, pp. 329-333.
Official Communication for European Patent Application No. 14189344.6 dated Feb. 20, 2015.
Apache HBase.
Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.
Rixon, Karl, "Update Multiple Rows with Different Values and a Single SQL Query." Apr. 30, 2009. http://www.karlrixon.co.uk/writing/update-multiple-rows-with-different-values-and-a-single-sgl-query/.
Official Communication for European Patent Application No. 13157474.1 dated May 28, 2013.
Wikipedia, "Federated Database System," Sep. 7, 2013, retrieved from the internet on Jan. 27, 2015 http://en.wikipedia.org/w/index.php?title=Federated_database_system&oldid=571954221.
Notice of Acceptance for Australian Patent Application No. 2014201034 dated Jun. 5, 2014.

(56) References Cited

OTHER PUBLICATIONS

Official Communication for New Zealand Patent Application No. 621812 dated Mar. 18, 2014.
Official Communication for European Patent Application No. 12179096.8 dated Mar. 13, 2013.
Official Communication for European Patent Application No. 15183721.8 dated Nov. 23, 2015.
Peng et al., "Large-scale Incremental Processing Using Distributed Transactions and Notifications", Proceedings of the 9th USENIX Symposium on Operating Systems Design and Implementation, USENIX, p. 14, 2010.
Bluttman et al., "Excel Formulas and Functions for Dummies," 2005, Wiley Publishing, Inc., pp. 280, 284-286.
Reedy, Sarah, "Policy and Charging Rules Function (PCRF)," Sep. 13, 2010, http://www.lightreading.com/document.asp?doc_id=680015 printed Dec. 10, 2013 in 4 pages.
Mentzas et al., "An Architecture for Intelligent Assistance in the Forecasting Process", Proceedings of the Twenty-Eighth Hawaii International Conference on System Sciences, vol. 3, pp. 167-176, Jan. 3-6, 1995.
Chang et al., "Bigtable: A Distributed Storage System for Structured Data", Google, Inc., OSDI'06: Seventh Symposium on Operating System Design and Implementation, Seattle, WA, Nov. 2006.
Sigrist, et al., "PROSITE, a Protein Domain Database for Functional Characterization and Annotation," Nucleic Acids Research, 2010, vol. 38, pp. D161-D166.
U.S. Appl. No. 14/108,187, filed Dec. 16, 2013, Notice of Allowance, dated Aug. 29, 2014.
U.S. Appl. No. 14/135,289, filed Dec. 19, 2013, Notice of Allowance, dated Oct. 14, 2014.
U.S. Appl. No. 14/268,964, filed May 2, 2014, Notice of Allowance, dated Dec. 3, 2014.
U.S. Appl. No. 14/192,767, filed Feb. 27, 2014, Notice of Allowance, dated Dec. 16, 2014.
U.S. Appl. No. 14/294,098, filed Jun. 2, 2014, Notice of Allowance, dated Dec. 29, 2014.
U.S. Appl. No. 14/473,860, filed Aug. 29, 2014, Notice of Allowance, dated Jan. 5, 2015.
U.S. Appl. No. 14/616,080, filed Feb. 6, 2015, Notice of Allowance, dated Apr. 2, 2015.
U.S. Appl. No. 14/486,991, filed Sep. 15, 2014, Notice of Allowance, dated May 1, 2015.
U.S. Appl. No. 14/225,084, filed Mar. 25, 2014, Notice of Allowance, dated May 4, 2015.
U.S. Appl. No. 14/289,596, filed May 28, 2014, First Action Interview, dated Jul. 18, 2014.
U.S. Appl. No. 14/289,599, filed May 28, 2014, First Action Interview, dated Jul. 22, 2014.
U.S. Appl. No. 14/294,098, filed Jun. 2, 2014, First Action Interview, dated Aug. 15, 2014.
U.S. Appl. No. 14/225,084, filed Mar. 25, 2014, First Action Interview, dated Sep. 2, 2014.
U.S. Appl. No. 14/268,964, filed May 2, 2014, First Action Interview, dated Sep. 3, 2014.
U.S. Appl. No. 14/306,154, filed Jun. 16, 2014, First Action Interview, dated Sep. 23, 2014.
U.S. Appl. No. 14/306,147, filed Jun. 16, 2014, First Action Interview, dated Sep. 9, 2014.
U.S. Appl. No. 14/306,138, filed Jun. 16, 2014, First Action Interview, dated Sep. 23, 2014.
U.S. Appl. No. 14/148,568, filed Jan. 6, 2014, Final Office Action, dated Oct. 22, 2014.
U.S. Appl. No. 14/294,098, filed Jun. 2, 2014, Final Office Action, dated Nov. 6, 2014.
U.S. Appl. No. 14/319,765, filed Jun. 30, 2014, First Action Interview, dated Nov. 25, 2014.
U.S. Appl. No. 14/323,935, filed Jul. 30, 2014, First Action Interview, dated Nov. 28, 2014.
U.S. Appl. No. 14/326,738, filed Jul. 9, 2014, First Action Interview, dated Dec. 2, 2014.
U.S. Appl. No. 14/289,596, filed May 28, 2014, Final Office Action, dated Jan. 26, 2015.
U.S. Appl. No. 14/319,765, filed Jun. 30, 2014, First Action Interview, dated Feb. 4, 2015.
U.S. Appl. No. 14/225,160, filed Mar. 24, 2014, Final Office Action, dated Feb. 11, 2015.
U.S. Appl. No. 14/306,138, filed Jun. 16, 2014, Final Office Action, dated Feb. 18, 2015.
U.S. Appl. No. 14/306,147, filed Jun. 16, 2014, Final Office Action, dated Feb. 19, 2015.
U.S. Appl. No. 14/225,084, filed Mar. 25, 2014, First Action Interview, dated Feb. 20, 2015.
U.S. Appl. No. 14/473,552, filed Aug. 29, 2014, Interview Summary, dated Feb. 24, 2015.
U.S. Appl. No. 14/225,006, filed Mar. 25, 2014, First Action Interview, dated Feb. 27, 2015.
U.S. Appl. No. 14/486,991, filed Sep. 15, 2014, Office Action, dated Mar. 10, 2015.
U.S. Appl. No. 14/306,154, filed Jun. 16, 2014, Final Office Action, dated Mar. 11, 2015.
U.S. Appl. No. 14/323,935, filed Jul. 30, 2014, First Action Interview, dated Mar. 31, 2015.
U.S. Appl. No. 14/326,738, filed Jul. 9, 2014, First Action Interview, dated Mar. 31, 2015.
U.S. Appl. No. 13/247,987, filed Sep. 28, 2011, Office Action, dated Apr. 2, 2015.
U.S. Appl. No. 14/289,596, filed May 28, 2014, Advisory Action, dated Apr. 30, 2015.
U.S. Appl. No. 14/306,154, filed Jun. 16, 2014, Advisory Action, dated May 15, 2015.
U.S. Appl. No. 14/639,606, filed Mar. 5, 2015, First Action Interview, dated May 18, 2015.
U.S. Appl. No. 14/225,160, filed Mar. 24, 2014, Advisory Action, dated May 20, 2015.
U.S. Appl. No. 14/579,752, filed Dec. 22, 2014, First Action Interview, dated May 26, 2015.
U.S. Appl. No. 14/306,138, filed Jun. 16, 2014, Office Action, dated May 26, 2015.
U.S. Appl. No. 14/289,599, filed May 28, 2014, Final Office Action, dated May 29, 2015.
U.S. Appl. No. 14/319,765, filed Jun. 30, 2014, Final Office Action, dated Jun. 16, 2015.
U.S. Appl. No. 13/835,688, filed Mar. 15, 2013, First Action Interview, dated Jun. 17, 2015.
U.S. Appl. No. 14/323,935, filed Jul. 30, 2014, Office Action, dated Jun. 22, 2015.
U.S. Appl. No. 12/556,318, filed Jun. 16, 2014, Office Action, dated Jul. 2, 2015.
U.S. Appl. No. 14/306,154, filed Jun. 16, 2014, Office Action, dated Jul. 6, 2015.
U.S. Appl. No. 14/326,738, filed Jul. 9, 2014, Final Office Action, dated Jul. 31, 2015.
U.S. Appl. No. 13/839,026, filed Mar. 15, 2013, Office Action, dated Aug. 4, 2015.
U.S. Appl. No. 14/306,147, filed Jun. 16, 2014, Office Action, dated Aug. 7, 2015.
U.S. Appl. No. 14/225,160, filed Mar. 24, 2014, Office Action, dated Aug. 12, 2015.
U.S. Appl. No. 14/490,612, filed Sep. 18, 2014, Final Office Action, dated Aug. 18, 2015.
U.S. Appl. No. 14/579,752, filed Dec. 22, 2014, Final Office Action, dated Aug. 19, 2015.
U.S. Appl. No. 14/225,006, filed Mar. 24, 2014, Final Office Action, dated Sep. 2, 2015.
U.S. Appl. No. 14/631,633, filed Feb. 25, 2015, First Action Interview, dated Sep. 10, 2015.
U.S. Appl. No. 14/726,353, filed May 29, 2015, First Action Interview, dated Sep. 10, 2015.
U.S. Appl. No. 14/225,084, filed Mar. 25, 2014, Office Action, dated Sep. 11, 2015.
U.S. Appl. No. 14/306,138, filed Jun. 16, 2014, Final Office Action, dated Sep. 14, 2015.

(56) References Cited

OTHER PUBLICATIONS

U.S. Appl. No. 13/839,026, filed Mar. 15, 2013, Restriction Requirement, dated Apr. 2, 2015.
U.S. Appl. No. 14/077,159, filed Nov. 11, 2013, Notice of Allowance, dated Aug. 15, 2014.
U.S. Appl. No. 14/077,159, filed Nov. 11, 2013, First Action Interview, dated Mar. 12, 2014.
U.S. Appl. No. 14/196,814, filed Mar. 4, 2014, Office Action, dated Dec. 14, 2016.
U.S. Appl. No. 14/225,006, filed Mar. 25, 2014, First Action Interview, dated Sep. 10, 2014.
U.S. Appl. No. 13/839,026, filed Mar. 15, 2013, Notice of Allowance, dated Jul. 6, 2015.
U.S. Appl. No. 14/196,814, filed Mar. 4, 2014, Notice of Allowance, dated Apr. 6, 2017.
U.S. Appl. No. 13/247,987, filed Sep. 28, 2011, Office Action, dated Sep. 22, 2015.
U.S. Appl. No. 13/831,199, filed Mar. 14, 2013, Office Action, dated May 9, 2016.
U.S. Appl. No. 13/196,788, filed Aug. 2, 2011, Notice of Allowance, dated Dec. 18, 2016.
U.S. Appl. No. 13/831,199, filed Mar. 14, 2013, Final Office Action, dated Nov. 4, 2016.
U.S. Appl. No. 14/289,599, filed May 28, 2014, Advisory Action, dated Sep. 4, 2015.
U.S. Appl. No. 14/806,517, filed Jul. 22, 2015, First Action Interview, dated Oct. 26, 2016.
U.S. Appl. No. 14/196,814, filed Mar. 4, 2014, Final Office Action, dated Apr. 16, 2014.
U.S. Appl. No. 14/196,814, filed Mar. 4, 2014, Final Office Action, dated Jun. 13, 2016.
U.S. Appl. No. 15/145,177, filed May 3, 2016, Office Action, dated Jul. 29, 2016.
U.S. Appl. No. 15/284,959, filed Oct. 4, 2016, Final Office Action, dated Aug. 28, 2018.
U.S. Appl. No. 15/284,959, filed Oct. 4, 2016, Notice of Allowance, dated May 9, 2019.
U.S. Appl. No. 14/304,741, filed Jun. 13, 2014, Final Office Action, dated Mar. 3, 2015.
U.S. Appl. No. 14/027,118, filed Sep. 13, 2013, Notice of Allowance, dated Feb. 4, 2016.
U.S. Appl. No. 14/813,749, filed Jul. 30, 2015, Office Action, dated Sep. 28, 2015.
U.S. Appl. No. 14/319,765, filed Jun. 30, 2014, Advisory Action, dated Sep. 10, 2015.
U.S. Appl. No. 14/134,558, filed Dec. 19, 2013, Final Office Action, dated May 16, 2016.
U.S. Appl. No. 14/690,905, filed Apr. 20, 2015, Office Action, dated Oct. 7, 2015.
U.S. Appl. No. 15/047,405, filed Feb. 18, 2016, Final Office Action, dated Oct. 4, 2016.
U.S. Appl. No. 14/304,741, filed Jun. 13, 2014, Notice of Allowance, dated Apr. 7, 2015.
U.S. Appl. No. 13/657,635, filed Oct. 22, 2012, Notice of Allowance, dated Jan. 29, 2016.
U.S. Appl. No. 14/304,741, filed Jun. 13, 2014, Office Action, dated Aug. 6, 2014.
U.S. Appl. No. 13/657,656, filed Oct. 22, 2012, Office Action, dated Oct. 7, 2014.
U.S. Appl. No. 14/254,773, filed Apr. 16, 2014, Notice of Allowance, dated Aug. 20, 2014.
U.S. Appl. No. 13/831,791, filed Mar. 15, 2013, Office Action, dated Mar. 4, 2015.
U.S. Appl. No. 13/827,627, filed Mar. 14, 2013, Office Action, dated Mar. 2, 2015.
U.S. Appl. No. 13/657,635, filed Oct. 22, 2012, Office Action, dated Mar. 30, 2015.
U.S. Appl. No. 13/657,656, filed Oct. 22, 2012, Final Office Action, dated May 6, 2015.
U.S. Appl. No. 13/767,779, filed Feb. 14, 2013, Notice of Allowance, dated Mar. 17, 2015.
U.S. Appl. No. 14/019,534, filed Sep. 5, 2013, Office Action Interview, dated Jul. 20, 2015.
U.S. Appl. No. 14/025,653, filed Sep. 12, 2013, First Office Action Interview, dated Oct. 6, 2015.
U.S. Appl. No. 13/827,627, filed Mar. 14, 2013, Office Action, dated Dec. 22, 2015.
U.S. Appl. No. 13/657,635, filed Oct. 22, 2012, Office Action, dated Oct. 7, 2015.
U.S. Appl. No. 14/581,902, filed Dec. 23, 2014, Notice of Allowance, dated Nov. 13, 2015.
U.S. Appl. No. 13/827,627, filed Mar. 14, 2013, Interview Summary, dated Oct. 20, 2015.
U.S. Appl. No. 12/556,307, filed Sep. 9, 2009, Notice of Allowance, dated Jan. 4, 2016.
U.S. Appl. No. 14/134,558, filed Dec. 19, 2013, Office Action, dated Oct. 7, 2015.
U.S. Appl. No. 13/831,791, filed Mar. 15, 2013, Final Office Action, dated Aug. 6, 2015.
U.S. Appl. No. 13/827,627, filed Mar. 14, 2013, Final Office Action, dated Aug. 26, 2015.
U.S. Appl. No. 14/019,534, filed Sep. 5, 2013, First Office Action Interview, dated Sep. 4, 2015.
U.S. Appl. No. 13/608,864, filed Sep. 10, 2012, Final Office Action, dated Jun. 8, 2015.
U.S. Appl. No. 13/411,291, filed Mar. 2, 2012, Office Action, dated Jul. 15, 2015.
U.S. Appl. No. 13/608,864, filed Sep. 10, 2012, First Office Action Interview, dated Mar. 17, 2015.
U.S. Appl. No. 12/556,307, filed Sep. 9, 2009, Final Office Action, dated Mar. 14, 2014.
U.S. Appl. No. 4/254,757, filed Apr. 16, 2014, Notice of Allowance, dated Sep. 10, 2014.
U.S. Appl. No. 14/025,653, filed Sep. 12, 2013, Interview Summary, dated Mar. 3, 2016.
U.S. Appl. No. 13/411,291, filed Mar. 2, 2012, Notice of Allowance, dated Apr. 22, 2016.
U.S. Appl. No. 13/657,656, filed Oct. 22, 2012, Notice of Allowance, dated May 10, 2016.
U.S. Appl. No. 13/827,627, filed Mar. 14, 2013, Notice of Allowance, dated Apr. 11, 2016.
U.S. Appl. No. 14/504,103, filed Oct. 1, 2014, First Office Action Interview, dated Feb. 5, 2015.
U.S. Appl. No. 13/196,788, filed Aug. 2, 2011, Interview Summary, dated Nov. 25, 2015.
U.S. Appl. No. 13/196,788, filed Aug. 2, 2011, Notice of Allowance, dated Dec. 18, 2015.
U.S. Appl. No. 14/746,671, filed Jun. 22, 2015, Notice of Allowance, dated Jan. 21, 2016.
U.S. Appl. No. 14/504,103, filed Oct. 1, 2014, Notice of Allowance, dated May 18, 2015.
U.S. Appl. No. 14/302,279, filed Jun. 11, 2014, Notice of Allowance, dated Apr. 5, 2016.
U.S. Appl. No. 14/196,814, filed Mar. 4, 2014, Office Action, dated May 5, 2015.
U.S. Appl. No. 15/066,970, filed Mar. 10, 2016, Notice of Allowance, dated Jun. 29, 2016.
U.S. Appl. No. 13/826,228, filed Mar. 14, 2013, Notice of Allowance, dated Mar. 27, 2015.
U.S. Appl. No. 14/726,211, filed May 29, 2015, Notice of Allowance, dated Jul. 27, 2016.
U.S. Appl. No. 14/877,229, filed Oct. 7, 2015, Office Action, dated Mar. 22, 2016.
U.S. Appl. No. 14/746,671, filed Jun. 22, 2015, First Office Action Interview, dated Nov. 12, 2015.
U.S. Appl. No. 14/580,218, filed Dec. 23, 2014, Office Action, dated Jun. 26, 2015.
U.S. Appl. No. 14/278,963, filed May 15, 2014, Notice of Allowance, dated Sep. 2, 2015.
U.S. Appl. No. 14/734,772, filed Jun. 9, 2015, First Office Action Interview, dated Jul. 24, 2015.

(56) References Cited

OTHER PUBLICATIONS

U.S. Appl. No. 14/734,772, filed Jun. 9, 2015, First Office Action Interview, dated Oct. 30, 2015.
U.S. Appl. No. 12/556,307, filed Sep. 9, 2009, Office Action, dated Jun. 9, 2015.
U.S. Appl. No. 14/451,221, filed Aug. 4, 2014, Notice of Allowance, dated Aug. 4, 2015.
U.S. Appl. No. 14/746,671, filed Jun. 22, 2015, First Office Action Interview, dated Sep. 28, 2015.
U.S. Appl. No. 14/504,103, filed Oct. 1, 2014, First Office Action Interview, dated Mar. 31, 2015.
U.S. Appl. No. 14/726,211, filed May 29, 2015, Office Action, dated Apr. 5, 2016.
U.S. Appl. No. 14/278,963, filed May 15, 2014, Final Office Action, dated Jan. 30, 2015.
U.S. Appl. No. 14/580,218, filed Dec. 23, 2014, Notice of Allowance, dated Dec. 2, 2016.
U.S. Appl. No. 14/451,221, filed Aug. 4, 2014, Ex Parte Quayle Action, Apr. 6, 2015.
U.S. Appl. No. 14/578,389, filed Dec. 20, 2014, Office Action, dated Oct. 21, 2015.
U.S. Appl. No. 13/196,788, filed Aug. 2, 2011, Office Action, dated Oct. 23, 2015.
U.S. Appl. No. 14/726,211, filed May 29, 2015, Office Action, dated Dec. 13, 2016.
U.S. Appl. No. 14/580,218, filed Dec. 23, 2014, Office Action, dated Jun. 7, 2016.
U.S. Appl. No. 13/411,291, filed Mar. 2, 2012, Office Action, dated Jan. 9, 2014.
U.S. Appl. No. 15/161,982, filed May 23, 2016, Office Action, dated Jul. 28, 2016.
U.S. Appl. No. 15/009,404, filed Jan. 28, 2016, Office Action, dated Nov. 7, 2017.
U.S. Appl. No. 15/009,404, filed Jan. 28, 2016, Notice of Allowance, dated Nov. 30, 2016.
U.S. Appl. No. 15/009,404, filed Jan. 28, 2016, Office Action, dated Jul. 12, 2016.
U.S. Appl. No. 14/481,338, filed Aug. 31, 2015, Office Action, dated Feb. 18, 2016.
U.S. Appl. No. 15/009,404, filed Jan. 28, 2016, Office Action, dated Jun. 30, 2017.
U.S. Appl. No. 14/302,279, filed Jun. 11, 2014, Office Action, dated Sep. 24, 2015.
U.S. Appl. No. 14/134,558, filed Dec. 19, 2013, Advisory Action, dated Aug. 26, 2016.
U.S. Appl. No. 12/556,307, filed Sep. 9, 2009, Office Action, dated Oct. 1, 2013.
U.S. Appl. No. 14/019,534, filed Sep. 5, 2013, Notice of Allowance, dated Feb. 4, 2016.
U.S. Appl. No. 13/411,291, filed Mar. 2, 2012, Interview Summary, dated Oct. 1, 2015.
U.S. Appl. No. 15/443,404, filed Feb. 27, 2017, Notice of Allowance, dated Oct. 16, 2017.
U.S. Appl. No. 15/443,404, filed Feb. 27, 2017, Office Action, dated May 3, 2017.
U.S. Appl. No. 15/284,959, filed Oct. 4, 2016, Final Office Action, dated Oct. 19, 2017.
U.S. Appl. No. 15/284,989, filed Oct. 4, 2016, Office Action, dated May 8, 2017.
U.S. Appl. No. 15/391,778, filed Dec. 27, 2016, Office Action, dated Jul. 28, 2017.
U.S. Appl. No. 15/391,778, filed Dec. 27, 2016, Final Office Action, dated Apr. 10, 2018.
U.S. Appl. No. 15/161,982, filed May 23, 2016, Notice of Allowance, dated Nov. 30, 2016.
U.S. Appl. No. 14/192,767, filed Feb. 27, 014, Notice of Allowance, dated Dec. 16, 2014.
U.S. Appl. No. 14/841,338, filed Aug. 31, 2015, Office Action, dated Feb. 18, 2016.
U.S. Appl. No. 15/284,959, filed Dec. 21, 2017, Advisory Action, dated Dec. 21, 2017.
U.S. Appl. No. 15/284,959, filed Oct. 4, 2016, Office Action, dated Mar. 2, 2018.

\* cited by examiner

FAIR SCHEDULING FOR MIXED-QUERY LOADS

PRIORITY CLAIM

This application claims the benefit as a continuation of application Ser. No. 14/726,211, filed May 29, 2015, which is a continuation of application Ser. No. 13/826,228, filed Mar. 14, 2013, now U.S. Pat. No. 9,092,482, the entire contents of each of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure relates generally to scheduling computer-executable tasks for execution by computing devices and, more specifically, to techniques for scheduling queries for execution by database management systems.

BACKGROUND

Many database management systems are available to help users manage data. One way such systems help users is to answer questions the users have about the data. In the context of database management systems, questions are typically referred to as "queries" and answers typically referred to as "results". Users submit queries to database management systems and receive answers to the queries in the form of results.

To answer queries, database management systems use computing resources such as memory and processor resources. Different queries require different amounts of computing resources to answer. For example, a query that returns 50,000 results may consume more computing resources than one that returns 10 results.

00 results, the fair scheduler 10 can execute multiple queries at the same time (i.e., (i.e., concurrently). The process performed by a database management system of determining the results of a query is often referred to as "executing" the query. Multiple queries executed concurrently by a database management system can contend with each other for use of the same computing resources. Many database management systems perform synchronization and scheduling functions for sharing computing resources amongst multiple concurrent query executions.

Unfortunately, despite these synchronization and scheduling efforts, problems can arise when database management systems execute multiple queries concurrently where some of the queries are "high cost" queries and others are "low cost" queries. With this type of mixed query-load, execution of the high cost queries can require use of so many computing resources that they "starve" low cost queries of computing resources. The result may be that the database management systems take a long amount of time to return answers to the low cost queries. Overall, some database management systems handle mixed query loads in such a way that latency of the low-cost queries and the throughput of the query load are longer than users expect them to be.

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

DETAILED DESCRIPTION

Figure 1:
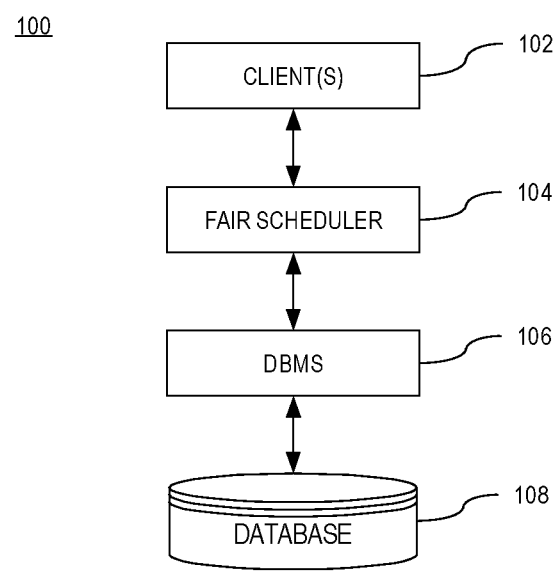
FIG. 1 is a block diagram illustrating a fair scheduling system, per an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

General Overview

A fair scheduling system with methodology for scheduling queries for execution by a database management system is described. In one embodiment, for example, a method is described for scheduling a query job for execution by a database management system as separately executable sub-query tasks. Each sub-query task can have a lower execution cost than the execution cost of the query job. Further, each sub-query task can have the same or approximately the same execution cost. The method may be performed multiply or concurrently for multiple query jobs.

The method includes obtaining the query job and a cost estimate to execute the job. As an example, the cost estimate may be specified as a number of results the query job is expected to return.

The method further includes dividing the query job into a plurality of sub-query tasks based on the cost estimate exceeding a predetermined threshold cost.

The method further includes enqueuing a query job item representing the query job onto the end (tail) of a job execution queue. When the query job item is enqueued, the job execution queue can contain other previously enqueued query job items corresponding to previously obtained query jobs.

After the query job item reaches the front (head) of the job execution queue which in typical operation does not occur until all previously enqueued query job items have been dequeued from the front of the job execution queue, the method further includes dequeuing the query job item from the front of the job execution queue.

After dequeuing the query job item, the method initiates execution of the first sub-query task of the query job by the database management system. After causing the database management system to begin executing the first sub-query task of the query job, the method determines whether there are more sub-query tasks of the query job to execute. If there are more sub-query tasks to execute, then the method again enqueues the query job item onto the end of the job execution queue. The dequeuing of the query job item from the front of the job execution queue, initiating execution of the next sub-query task of the query job, and enqueuing the query job item back onto the end of the job execution queue can be repeated until execution of all of the sub-query tasks of the query job have been initiated.

If, after dequeuing a query job item from the front of the job execution queue and initiating execution of the last sub-query task, there are no more sub-query tasks to execute, then the query job item is not enqueued again onto the end of the job execution queue.

In some embodiments, the method enforces a maximum number of query job items that can be enqueued onto the job execution at the same time. More specifically, a query job item for a newly obtained query job is not enqueued onto the end of the job execution queue if the number of query job items already in the job execution queue is at the maximum number. The query job item is enqueued onto the job execution after an existing query job item is dequeued and the method determines that there are no more sub-query tasks to execute for the query job corresponding to the dequeued query job item. Since multiple query jobs can be obtained when the number of query job items already in the job execution queue is at the maximum number, a separate queue can be maintained to hold query job items for query jobs that are waiting to be added to job execution queue. Enforcing the maximum number of query job items that can be enqueued onto the job execution at the same time effectively limits the number of sub-query tasks concurrently executed by the database management system and can avoid negatively affecting throughput of query loads with many high cost queries.

Techniques are provided for scheduling, in a fair manner, queries for execution by database management systems. In one embodiment, the techniques involve obtaining a computer-executable job and a cost estimate to execute the job. For example, the computer-executable job can be a query and the cost estimate can be specified as a number of results the query is expected to return.

Based on the cost estimate exceeding a threshold cost, the job is divided into a sequence of computer-executable tasks. For example, if the query is expected to return 50,000 results and the threshold cost is 1,000 results, the query can be divided evenly into 50 sub-query tasks each of which returns 1,000 results. The techniques further involve enqueing a job item representing the job onto the end of a job execution queue. Other previously obtained jobs can be similarly divided and job items representing those other jobs similarly previously enqueued onto the end of the job execution queue.

After the job item for the job has reached the front of the job execution queue, the job item is dequeued from the front of the job execution queue. After dequeing the job item, the techniques further involve causing execution of the first task of the job to be initiated by a database management system. After initiating execution of the first task, a determination is made whether there are more tasks of the job to execute. If there are more tasks of the job to execute, the job item for the job is re-enqueued onto the end of the job execution queue. If there are no more tasks of the job to execute, then the job item is not re-enqueued. The dequeing, initiating execution of the next task of the job, and re-enqueing of the job item repeats until all tasks of the job have completed or the job is cancelled. The dequeing, initiating execution of the next task, and re-enqueing can be similarly repeated for all job items in the job execution queue.

Per one aspect of the present invention, the techniques involving dividing a query job into multiple sub-query tasks where each sub-query task, when executed, returns a "page" of the results that the query job would return if executed as a single task. For example, a query job that is expected to return 50,000 results can be divided into 50 sub-query tasks where the first sub-query task returns the first 1,000 results of the 50,000 results, the second sub-query task returns the next 1,000 results of the 50,000 results, etc. to the fiftieth sub-query task of that returns the last 1,000 results of the 50,000 results.

Fair Scheduling System

FIG. 1 is a block diagram illustrating a fair scheduling system, per an embodiment. The system 100 includes one or more clients 102 operatively coupled to fair scheduler 104. Fair scheduler 104 is operatively coupled to database management system 106 which is operatively coupled to database 108.

Clients 102 can be any set of one or more computing devices that submit query job requests to fair scheduler 104. Examples of clients 102 include, but are not limited to, personal computing devices, desktop computing devices, workstation computing devices, server computing devices, mobile phones, tablets, laptops or any other phone or general-purpose computing device that is executing software for submitting query job requests to fair scheduler 104. Clients 102 also may comprise processes or programs.

Clients 102 can be operated by users in which case the users can command clients 102 to submit query job requests to fair scheduler 104. Such commands can be caused by user interactions with graphical user interfaces or command line interfaces, for example. Alternatively, clients 102 can operate "unattended". In this case, an automated process executing on clients 102 can submit query job requests to fair scheduler 104. In addition, some clients 102 can be operated by users and other clients 102 can operate unattended. Thus, a mix of user-operated and unattended clients 102 is possible. In some usage scenarios, multiple clients 102 submit multiple query job requests to the fair scheduler 104 at or about the same time.

Fair scheduler 104 can be any set of one or more computing devices configured to perform any of the fair scheduling techniques described herein. Examples of fair scheduler 104 include, but are not limited to, personal computing devices, desktop computing devices, workstation computing devices, server computing devices, or any other general-purpose computing device that is executing software for performing any of the fair scheduling techniques described herein.

Database management system 106 can be any set of one or more computing devices used to execute queries against database 108. Examples of database management system 106 include, but are not limited to, personal computing devices, desktop computing devices, workstation computing devices, server computing devices, or any other general-purpose computing device that is executing database management software. The database management software can be any database management software capable of supporting any of the fair scheduling techniques disclosed herein. In one exemplary non-limiting embodiment, the database management software is a version of Apache Cassandra. In another exemplary non-limiting embodiment, the database management software is a version of Apache HBase.

Database 108 can be any set of one or more computing devices used to store data against which the database management system 106 executes queries. Examples of database 108 include, but are not limited to, personal computing devices, desktop computing devices, workstation computing devices, server computing devices, or any other general-purpose computing device that is storing database data managed by database management system 106.

In some embodiments, such as the embodiment of the FIG. 1, clients 102, fair scheduler 104, database management system 106, and database 108 are each separate sets of computing devices. In other embodiments, one or more of clients 102, fair scheduler 104, database management system 106, and database 108 are the same set of computing devices in other embodiments. For example, client 102, fair scheduler 104, database management system 106, and database 108 can be the same computing device. Where more than one of clients 102, fair scheduler 104, database management system 106, and database 108 are the same set of computing devices, software components executing on the computing devices can execute as part of the same process or the same set of processes or in different processes or different sets of processes. For example, where the fair scheduler 104 and the database management system 106 are the same set of computing devices, software components for performing fair scheduling techniques described herein and software components for executing queries against database 108 can execute as part of the same Java Virtual Machine (JVM) process or set of processes.

If executing in separate processes or separate sets of processes, software components of clients 102, fair scheduler 104, and database management system 106 can communicate with each other using any suitable inter-process communications mechanism including, but not limited to, networking communications protocols such as, for example, Transmission Control Protocol/Internet Protocol (TCP/IP). If executing in the same process, the software components can communicate with each other through one or more Application Programming Interfaces (APIs).

Query Job Requests

In an embodiment, clients 102 submit query job requests to the fair scheduler 104. A query job request can contain values for query parameters and can contain a query execution cost estimate, among other information. As discussed in greater detail below, the fair scheduler 104 can use the query parameter values and the cost estimate in the query job request when causing sub-query tasks of query job to be executed by the database management system 106.

The query parameters can vary between different query jobs per the requirements of the implementation at hand. One non-limiting example of a query job is: get the group of columns contained by a specified column family for a specified row of the column family that satisfy a specified column name range predicate. An example of such a query job expressed according a version of the Apache Cassandra Thrift API is:

```
get_slice("key" : key,
    "column_parent" : {"column_family" : column_family},
    "predicate" :
        { "slice_range" :
            { "start" : start_column_name,
              "end" : end_column_name,
              "reverse" : reverse,
              "count" : count }
        })
```

In the above-example query job, there are six query parameters: key, column_family, start_column_name, end_column_name, reverse, and count. Other query jobs may have a fewer number or a greater number of query parameters or different query parameters. In the above-example query job, values for one or more of the six query parameters can be specified in a query job request. Values for any other query parameters that are not specified in the query job request can be provided by the fair scheduler. For example, a query job request can specify a value for the key parameter and a value for the start_column_name parameter and the fair scheduler 104 can provide values for the column_family, end_column_name, reverse, and count query parameters, as just one example.

In the above-example query job, the value of the key query parameter uniquely identifies a row in the column family specified by the value of the column_family parameter. The columns of that row of that column family can be ordered by column name. The value of the reverse parameter is a Boolean value. If the value of the reverse parameter is false, then the column name range predicate of the above-example query job restricts results to columns having a column name that is greater than or equal to the value of start_column_name parameter and less than or equal to the value of the end_column_name_parameter. If the value of the reverse parameter is true, then the column name range predicate restricts results to columns having a column name that is less than or equal to the value of start_column_name parameter and greater than or equal to the value of the end_column_name parameter. The value of the count parameter limits the number results to the specified number of the columns that satisfy the column name range predicate.

Example Query Job Request

For providing clear examples, embodiments of the fair scheduling techniques of the present disclosure are described hereinafter with respect to an example query job request. However, the techniques are not limited to the example query job request.

The example query job request follows an example use case in which network access information is stored in a column family of the database by network address of the accessing network device and the time of the network access.

Figure 2:
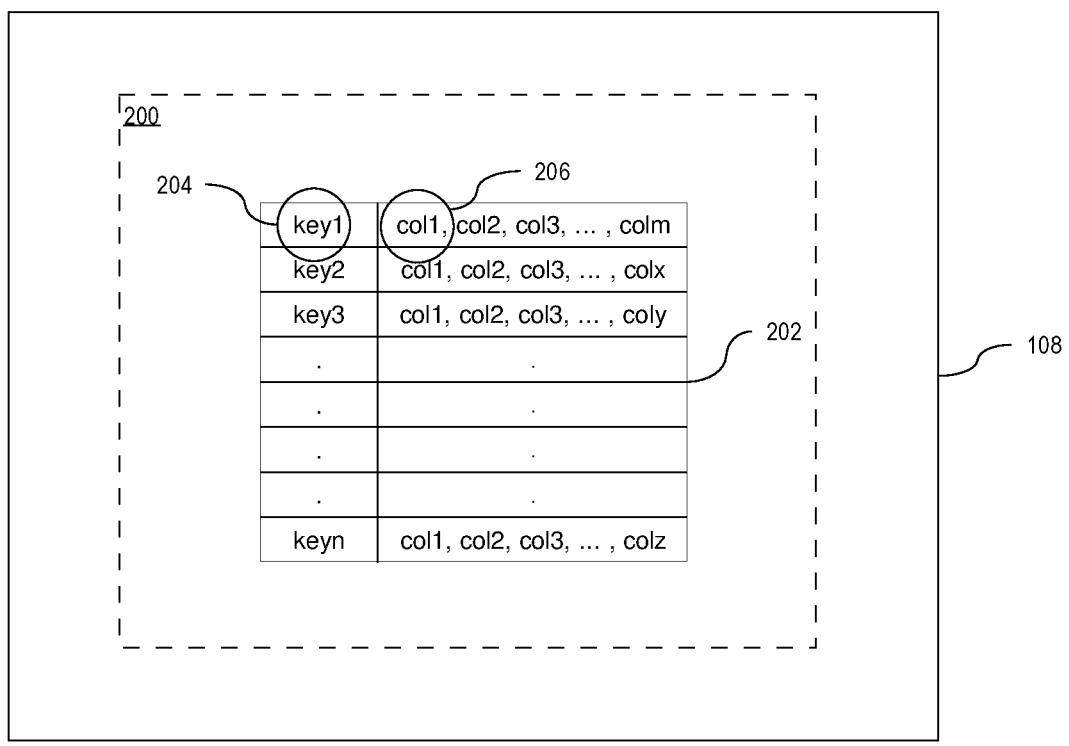
FIG. 2 is a block diagram illustrating a possible database data model for storing network access information, per an embodiment.

A possible data model 200 of a database 108 for storing the network access information is illustrated in FIG. 2. The data model 200 includes a column family 202. The column family 202 contains one or more rows. Each row can be keyed by a unique key. For example, key 204 can uniquely identify the first row of column family 202. Each row can contain a set of zero or more ordered columns. Each column can have a name and a value. Within a row, each column name can be unique. The columns of a row can be ordered by column name per an ordering scheme. Example ordering schemes include ASCII, UTF-8, Long, UUID (lexical or time), date, a combination two or more of the foregoing ordering schemes, and other ordering schemes. Different rows can have different numbers of columns. For example, one row can have only one column and another row can have a billion or more columns. Different column values may have different sizes. For example, one column value can be just a few bytes in size while another column value can be 1 gigabyte or more in size.

For the use case of storing network access information, each key of the column family 202 can be a network address. For example, key 204 may be an Internet Protocol (IP) address such as "192.168.0.10". The columns in a row of the column family 202 can store information about network access involving the network address identified by the key of the row. For example, each column of the row can correspond to a single network access event involving the network address. For example, the name of the column within a row can be a unique timestamp value (unique for a column name within the row) representing the date and time of the network access event and the value of the column can be information about the network access event such as information collected from network access logs, e-mail messages, call data records, etc.

In a variation of on the example use case, each column of a row can correspond to multiple network access events involving the network address. For example, the name of the column within the row can be a unique timestamp value (unique for a column name within the row) representing a range of time during which one or more network access events involving the network address occurred. The name of the column can correspond to the starting time of the range. Recalling that columns of a row can be stored in ascending order by column name, the ending time of the range can be determined from the name of the next column in the row. The value of the column can include one or more sub-values. The value can be variable length encoded or otherwise encoded or compressed. Each sub-value can correspond to a single network access event involving the network address. A sub-value corresponding to a network access event can have three parts:

An offset from the time in the column name. The time at which the corresponding network access event occurred can be determined from the column name and the offset;

A pointer to a block of information containing information about one or more network access events including the corresponding network address event. For example, the pointer can be a key and a column name of another column family that stores blocks of information about network access events.

A sub-block identifier that identifies, within the block of information identified by the pointer, sub-information about the corresponding network access event. For example, the sub-block identifier can be a byte offset range or a line number range that identifies the sub-information within the block of information.

Different query job requests can request different numbers of results. For example, with the example use cases, the number of results returned can depend on the range of time specified in the query job requests. For example, one query job request can request network access information involving a specified network address for a range of time that spans days, weeks, or months while another query job request can request network access information for a range of time that spans minutes. The query job request for the larger span of time can return tens of thousands of results or more while the query job request for the smaller span of time can return only ten results of less. If the larger query job is executed by the database management system 106 concurrently with the smaller query job, the latency of the smaller query job can be negatively affected by the concurrent execution of the larger query job.

Query Job Cost Estimate

As mentioned above, a query job request from a client 102 can include a cost estimate for the database management system 106 to execute the query job. For example, the query job request can specify the number of results the query job is expected to return. For example, for the above example query job involving network access information, a query job request can specify a number of columns that the query job is expected to return.

Alternatively, a query job request may not specify a query job cost estimate. In this case, the fair scheduler 104 may generate a query cost estimate. Such estimate may be generated in several different ways and the fair scheduler 104 is not limited to any way of generating a query cost estimate. For example, the fair scheduler 104 may generate a query cost estimate based on query parameters values specified in the query job request. For example, the fair scheduler 104 may ask the database management system 106 for a cost estimate providing the query parameter values for use by the database management system in generated the cost estimate. The database management system may not completely execute the query job when generating the estimate. The fair scheduler 104 may generate a query cost estimate in other ways and embodiments are not limited to any way of generating a query cost estimate.

Yet another alternative, a final query cost estimate may be generated based on a combination of a query cost estimate provided in a query job request and a preliminary query cost estimate generated by the fair scheduler 104. The preliminary cost estimate may be generated per the approach in the previous paragraph, for example. For example, the fair scheduler 104 may generate the final query cost estimate based on a mathematical combination of the query cost estimate in the query job request and the preliminary query cost estimate generated by the fair scheduler. This alternative can be performed by the fair scheduler to reduce cost estimation errors relative the above approaches where only one of the query job request or the fair scheduler 104 provides the cost estimate.

Threshold Cost

As indicated above, the query cost estimate for a query job is used by the fair scheduler 104 to determine whether the query job should be broken down into separately executable sub-query tasks. This determination can be made by comparing the query cost estimate to a threshold cost. If the query cost estimate exceeds the threshold cost, then the fair scheduler can cause the query job to be executed by the database management system 106 as multiple sub-query tasks. If the query cost estimate is lower than the threshold cost, then the query job can be executed as a single query task.

The threshold cost can be predefined. For example, a query job with a cost estimate above 1,000 results can be broken up into multiple separately executable sub-query tasks. In this case, if the cost estimate is at or below 1,000, the query job can be executed as a single task.

The threshold cost can be determined based on query execution metrics collected for previously executed query jobs. Such metrics can include measured executions latencies of the previously executed query jobs. Execution latency for a query job can be measured, for example, as the time between:

when the query job starts execution and when the first result of the query job is returned, when the query job starts execution and when the last result of the query job is returned, a mathematical combination of the above two execution latency metrics.

Query execution metrics collected for previously executed query jobs can also include measured execution throughput. Measured execution throughput can be measured, for example, as the number of query jobs that start and finish execution within a certain period of time.

Collected query execution metrics can be used by the fair scheduler to adjust the threshold cost on an ongoing basis.

Dividing Query Jobs

As mentioned above, the fair scheduler can divide the query job into multiple sub-query tasks if the cost estimate for the query exceeds the threshold cost. In one approach, the fair scheduler divides the query job evenly based on the cost estimate and the current threshold cost. For example, if the cost estimate for a query job is 100,000 results and the current threshold cost is 1,000 results, the fair scheduler can divide the query job into 100 sub-query tasks each expected to return 1,000 results. By dividing each query job of a mixed-query load evenly, or approximately evenly, as separately executable sub-query tasks that are executed in a round-robin fashion through the job execution queue, the high cost query jobs of the mixed-load are executed fairly with the low-cost query jobs of the mixed-load thereby preventing the high cost query jobs from starving the low cost query jobs for computing resources of the database management system.

In other approaches, query jobs are divided unevenly. For example, a query job that exceeds the threshold cost can be divided into multiple sub-query tasks where each successive sub-query task is expected to return fewer and fewer results (or, alternatively, more and more results).

Paging Query Results

The fair scheduler 104 can divide a query job into multiple sub-query tasks by using a result limiter for each of the sub-query tasks. The result limiter limits the number of results that the sub-query task returns when executed by the database management system 106. For example, the count query parameter can be used in the following sub-query task to limit the number of results returned when the sub-query task executed by the database management system 106 to at most the specified number of results.

```
get_slice("key" : key,
    "column_parent" : {"column_family" : column_family},
    "predicate" :
        { "slice_range" :
            { "start" : start_column_name,
              "end" : end_column_name,
              "reverse" : reverse,
              "count" : count }
        } )
```

If a sub-query task, when executed, returns the number of results specified as the result limiter, then the fair scheduler 104 can determine that more results of the query job are available. In this case, the fair scheduler 104 can configure the next sub-query task to get the next set of results based on the last result returned by the previous sub-query task. For example, given a threshold cost of 1,000 results and a query job request with a cost estimate of 10,000 results, the fair scheduler 104 can cause the database management system 106 to execute the following sub-query task to obtain the first 1,000 results:

```
get_slice("key" : key,
    "column_parent" : {"column_family" : column_family},
```

-continued

```
    "predicate" :
        { "slice_range" :
            { "start" : start_column_name,
              "end" : '',
              "reverse" : reverse,
              "count" : 1000 }
        } )
```

In the above example, sub-query task, the value ' ' for the end sub-parameter indicates to the database management system 106 that at most 1000 columns should be returned from the row keyed by the value for the key parameter starting with the column in the row having the name matching the value of the start_column_name parameter. If less than 1000 columns are returned by this sub-query task, then the query job is finished and no more sub-query tasks need be executed for the query job. If this is the case, the query estimate of 10,000 columns was inaccurate by an order of magnitude. If, as expected, 1,000 columns are returned by this sub-query tasks, then the next sub-query task for the query job can be configured based on the name of the last column returned by the previous sub-query task. For example, assume the parameter last_column_name holds as its value the name of the last column (e.g., the $1000^{th}$ column) returned by the first sub-query task that returned the first 1,000 columns. The fair scheduler 104 can cause the database management system to execute the following sub-query task to obtain the next 1,000 results:

```
get_slice("key" : key,
    "column_parent" : {"column_family" : column_family},
    "predicate" :
        { "slice_range" :
            { "start" : last_column_name,
              "end" : '',
              "reverse" : reverse,
              "count" : 1001 }
        } )
```

Here, since name of the last column returned by the previous sub-query task is provided as the value for the start parameter in this sub-query task, the first column returned by this sub-query task will be the same as the last column returned by the previous sub-query task. This is done to avoid inadvertently skipping columns between two consecutively executed sub-query tasks for a query job. Accordingly, a value of 1001 is provided for the count parameter to obtain the next 1,000 columns.

The above paging scheme assumes that the columns within a row are ordered by column name and the names of the columns within the row are unique within the row. More generally, the above paging scheme can be applied over a set of potential results in which each potential result is ordered within the set by a unique value associated with the potential result.

Method of Operation

The following description presents method steps that may be implemented using computer-executable instructions, for directing operation of a device under processor control. The computer-executable instructions may be stored on a computer-readable medium, such as hard disk, CD, DVD, flash memory, or the like. The computer-executable instructions may also be stored as a set of downloadable computer-executable instructions, for example, for downloading and installation from an Internet location (e.g., Web server).

Figure 3A:
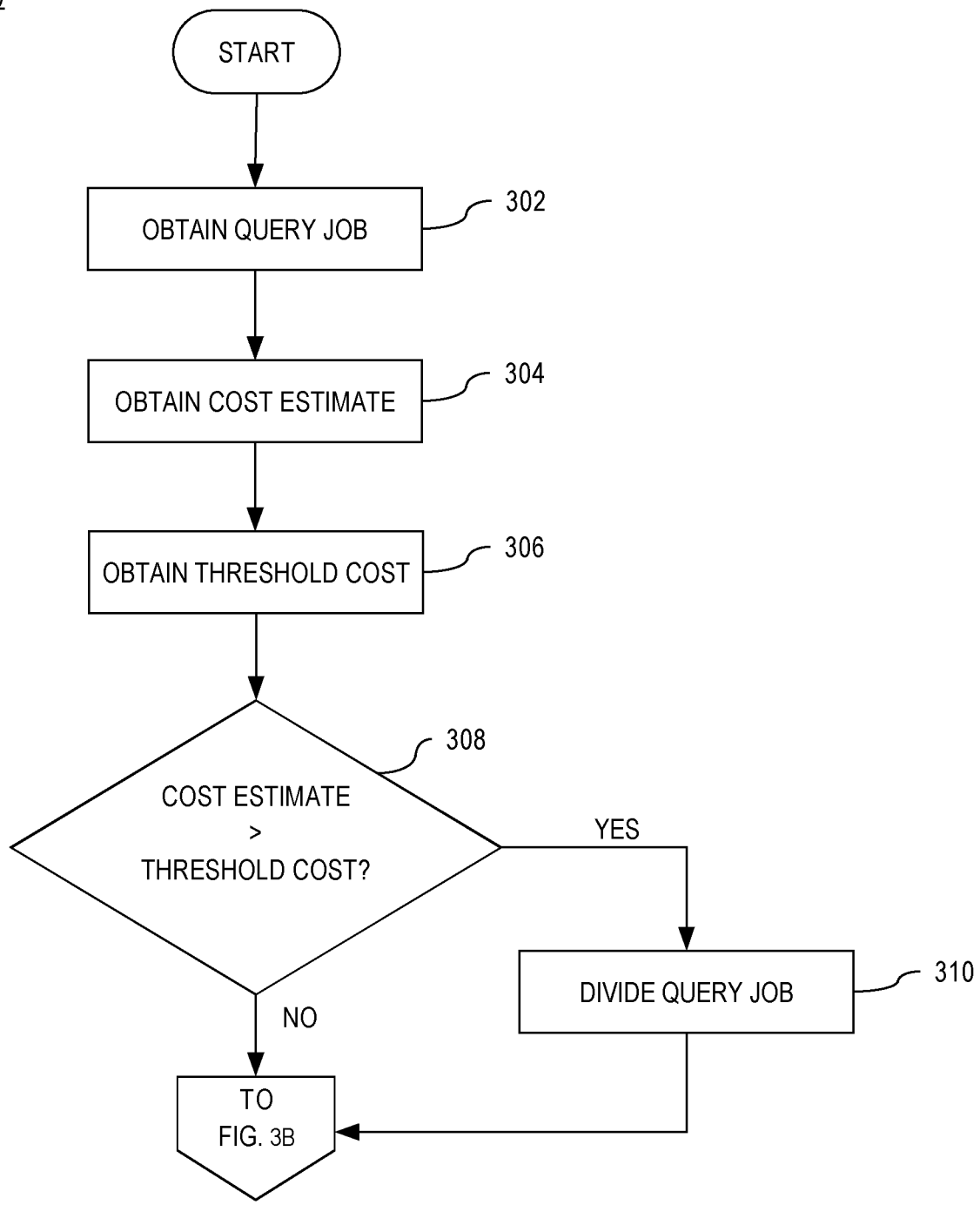
FIG. 3A and FIG. 3B comprise a single flowchart illustrating operation of the fair scheduling system per an embodiment.
Figure 3B:
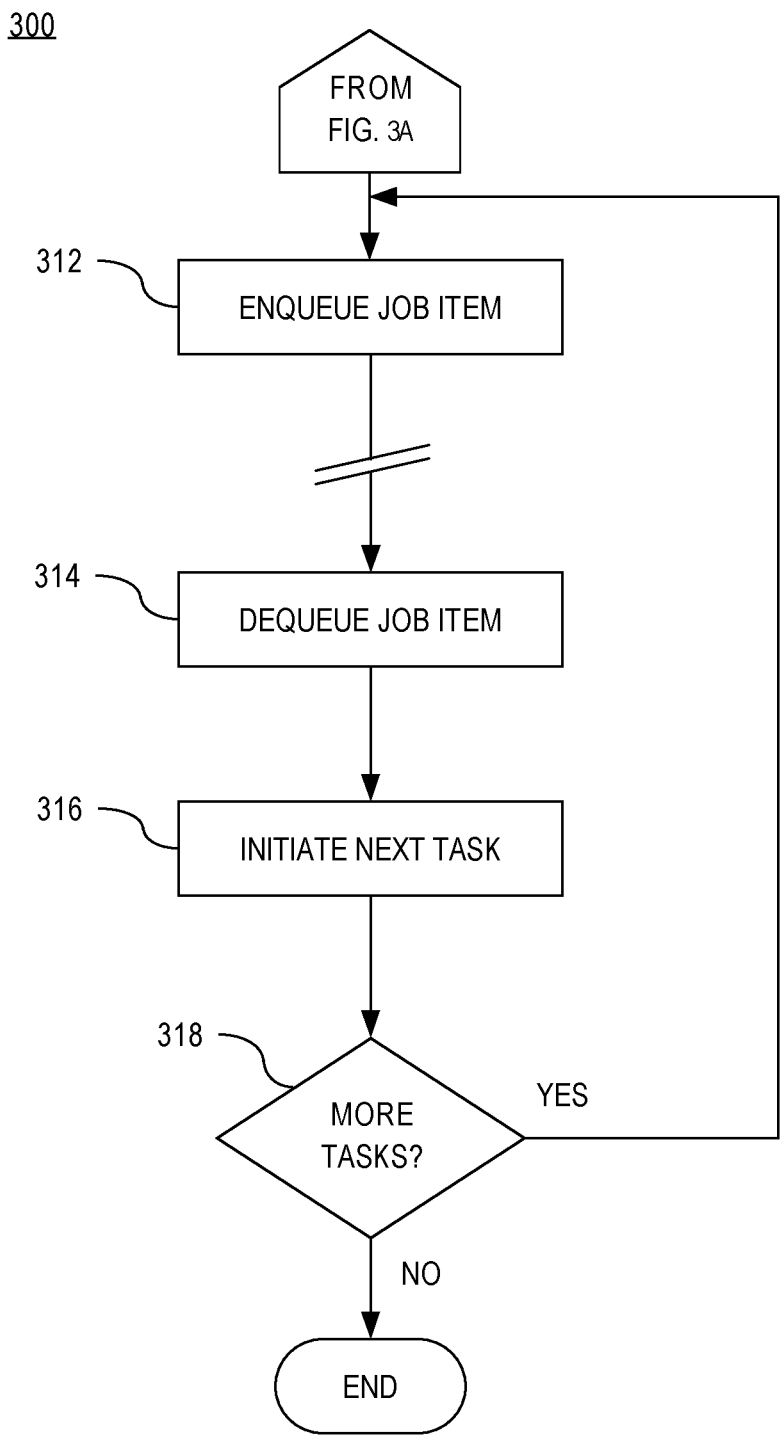

FIG. 3A and FIG. 3B comprise a single flowchart 300 illustrating overall operation of the fair scheduling system, per an embodiment. The method of operation starts at step 302, with the system obtaining a query job. How the system obtains the query job is not of importance. For example, the system can obtain the query job in a query job request or some other way. At a minimum the query job contains a specification of one or more query parameters.

At step 304, the system obtains a cost estimate for the query job. As with the query job, how the system obtains the cost estimate is not particularly important. For example, the cost estimate may be specified in a query job request if the query job was obtained in a query job request. As another example, the cost estimate may be obtained from a cost analysis of the query job performed by the system. The cost analysis may be based on the query parameters specified in the query job.

At step 306, the system obtains a threshold cost in some manner. The threshold cost may be predetermined before step 302 (i.e., before the query job is obtained). Generally, a threshold cost is selected so that high cost query jobs are broken down into multiple separately executable lower cost sub-query tasks. If the threshold cost is too high, not enough high cost query jobs may be broken down into multiple separately executable lower cost sub-query tasks by the system thereby causing excessive starvation of concurrently executing low cost query jobs for shared computing resources. If, on the other hand, the threshold cost is too low, low cost query jobs may be unnecessarily broken down into multiple separately executable lower cost sub-query tasks by the system thereby causing excessive latency for the low-cost query jobs.

The threshold cost may be configured by an administrator of the system. During operation, the system may dynamically adjust the threshold cost based on query workload history. Such history may include query execution metrics for low cost and high cost query jobs. Such query execution metrics can include latency and throughput of query jobs, or another metric.

At step 308, the system determines whether the obtained cost estimate exceeds (or equals) the obtained threshold cost. If so, system determines (step 310) to divide the query job into multiple separately executable sub-query tasks. The division may be based on the cost estimate and the threshold cost. For example, the query job can be divided evenly into N sub-query tasks where N is the ((cost estimate/threshold cost)+1). In this case, the first N–1 tasks would be expected to have equal execution cost. The Nth task would be expected to have at most the execution cost of one of the first N–1 tasks. If the system determines that the obtained cost estimate does not exceed (or equals) the obtained threshold cost, then the query job is not divided and executed as a single query task.

Whether the query job is divided or not, at step 312, a job item representing the query job is enqueued to the end of a job execution queue. The job execution queue holds up to M number of job items where M represents the maximum number of query jobs that the system will allow the database management system to concurrently execute query tasks for. Like the threshold cost, the size of the job execution queue (e.g., the maximum number M of job items allowed in the job execution queue at one time) may be predetermined and/or dynamically adjusted based on query workload history. If the job execution queue has M job items in it when a new query job is obtained at step 302 (i.e., the job execution queue is full), then the system may block further processing of the new query job until an existing query job finishes execution (e.g., until an existing query job is cancelled and the job item for the query job is removed from the job execution queue or until all sub-query tasks of an existing query job have been executed and the job item for the query is dequeued from the job execution queue). The system may maintain another queue for ordering and tracking new query jobs that are obtained when the job execution queue is full.

At step 314, the job item enqueued at step 312 is dequeued after the job item reaches the front of the job execution queue. The job item will not reach the front of the job execution queue until all job items closer to the front of the job execution queue have been dequeued or removed from the job execution queue. Among other information, a job item representing a query job enqueued onto the job execution queue may contain query job specification data such as query parameters for the query job. The job item may also contain fair scheduling bookkeeping data such as (a) the number of sub-query tasks the query job was divided into, if the query job was divided at step 310, (b) a numerical result limiter to be used for all sub-query tasks or per-sub-query tasks numerical result limiters, and (c) a paging value representing the last result returned from the most recently completed sub-query task which can be used to configure the next sub-query task.

At step 316, the system causes the next sub-query task to be executed by the database management system. If the query job was not divided, the next sub-query task will be the only query task executed for the query job. If the query job was divided, then the next sub-query task is configured with a result limiter that limits the number of results returned by the database management system.

At step 318, the system determines if there are more sub-query tasks of the query job to execute. If so, the method returns to step 312 to re-enqueue the job item for the query job to the end of the job execution queue. If, at step 318, there are no more sub-query tasks to execute, then the query job is finished and the job item for the query job is not re-enqueued to the end of the job execution queue.

Scheduling query jobs through the job execution may be performed by the system to ensure a fair scheduling of mixed query loads. Through the system's use of the job execution queue, both high cost and low cost query jobs may be fairly and concurrently executed by the database management system in a round-robin fashion.

Cancelling a Query Job

It may be the case that execution of a sub-query task for a query job by the database management system is not progressing. For this or some other reason, a user of the fair scheduling system may wish to cancel a currently executing query job. Accordingly, in some embodiments, a request to the fair scheduling system to cancel a currently executing query job is received. Upon receiving the cancel request, the fair scheduling system removes the job item corresponding to the query job from the job execution queue. Thus, no further sub-query tasks of query job will be executed. This cancellation may have no effect on execution of the currently sub-query tasks In some embodiments in which the database management system operates on multiple computing nodes, the system re-submits a cancelled query job as a new query job with the same query parameters but for execution on a different computing node than the computing device that the cancelled query job was last executing on when cancelled. This is useful if the reason the cancelled query job was not progressing was because of a problem at the computing node on which the cancelled query job was last executing.

The cancellation request may be provided by a user through a graphical user interface presented on the user's personal computing device. For example, the user interface may present a list of currently executing query jobs and associated interactive graphical user interface elements for cancelling selected query jobs.

Hardware Overview

Per one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
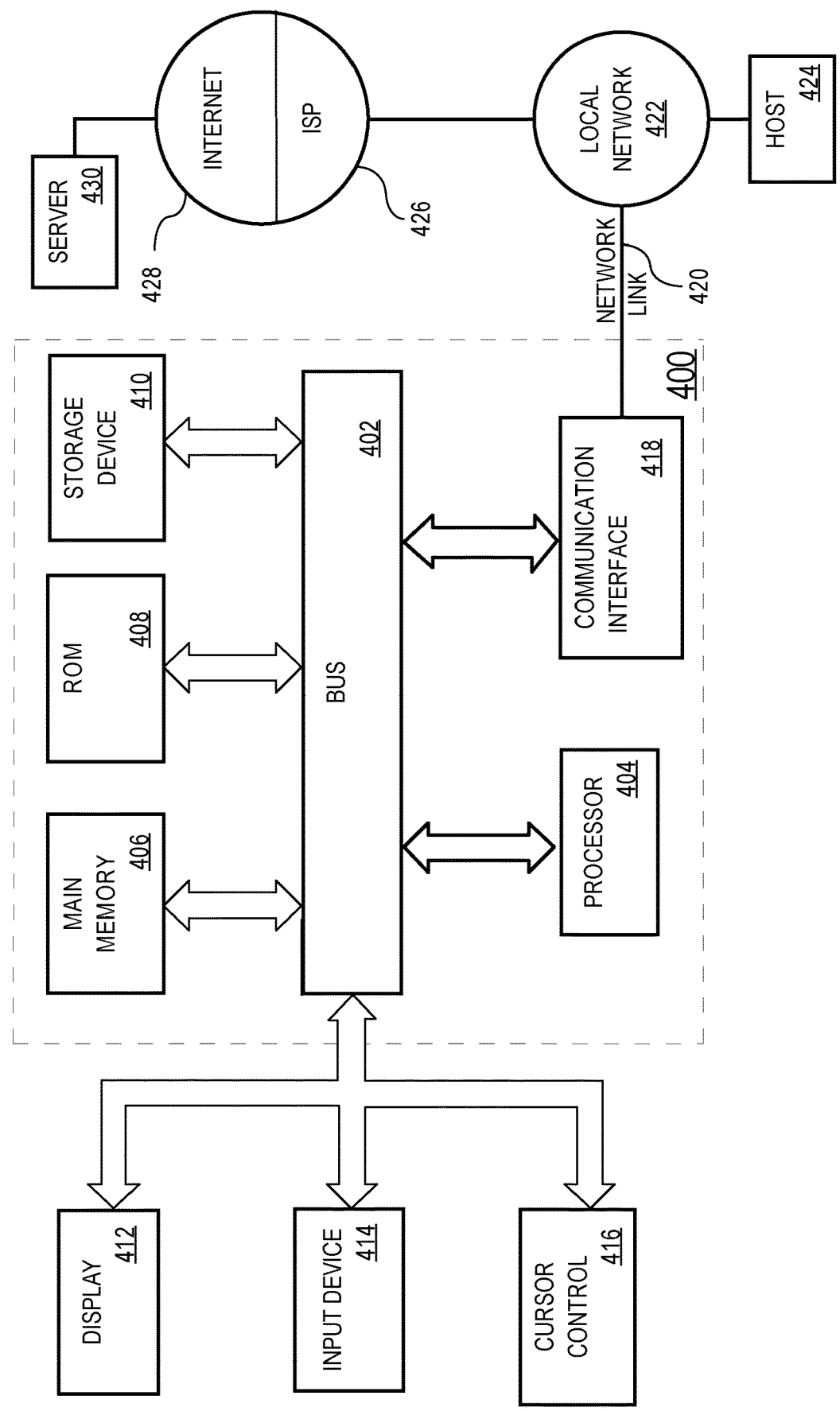
FIG. 4 is a block diagram of a computer system upon which embodiments can be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read-only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. Per one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described regarding numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computing system, comprising:
  one or more processors;
  storage media;
  one or more programs stored in the storage media and configured for execution by the one or more processors, the one or more programs comprising instructions configured for:
  obtaining a query for execution by a database management system and a cost estimate for the database management system to execute the query;
  enqueuing an item for the query onto a queue, the queue having a head, a tail, and a maximum number of allowed items;
  based, at least in part, on the cost estimate, dividing the query into a plurality of sub-queries;
  based, at least in part, on an item for the query reaching the head of the queue, causing a first sub-query of the plurality of sub-queries to be executed by the database management system; and
  based, at least in part, on determining there are more sub-queries of the plurality of sub-queries to be executed by the database management system:
    re-enqueuing an item for the query onto the tail of the queue if a current number of items in the queue is less than the maximum number of allowed items, or
    waiting until a current number of items in the queue is less than the maximum number of allowed items before re-enqueuing an item for the query onto the tail of the queue if a current number of items in the queue is not less than the maximum number of allowed items.

2. The computing system of claim 1, wherein the cost estimate is a number of query results the query is expected to return.

3. The computing system of claim 1, the one or more programs comprising instructions configured for:
  based, at least in part, on the determining there are more sub-queries of the plurality of sub-queries to be executed by the database management system, re-enqueuing an item for the query onto the tail of the queue.

4. The computing system of claim 1, the one or more programs comprising instructions configured for:
  based, at least in part, on the determining there are more sub-queries of the plurality of sub-queries to be executed by the database management system, waiting until a current number of items in the queue is less than the maximum number of allowed items before re-enqueuing an item for the query onto the tail of the queue.

5. The computing system of claim 1, wherein the first sub-query is configured with a result limiter that limits a number of results the first sub-query returns.

6. The computing system of claim 1, the one or more programs further comprising instructions configured for:
  de-queueing an item for the query from the head of the queue; and
  wherein the causing the first sub-query to be executed by the database management system is based, at least in part, on the de-queueing.

7. The computing system of claim 1, the one or more programs further comprising instructions configured for:
  based, at least in part, on determining there are no more sub-queries of the plurality of sub-queries to be executed by the database management system, not re-enqueuing an item for the query onto the tail of the queue.

8. A method performed by a computing system comprising one or more processors, storage media, and one or more programs stored in the storage media and executed by the one or more processors to perform the method, the method comprising:
  obtaining a query for execution by a database management system and a cost estimate for the database management system to execute the query;
  enqueuing an item for the query onto a queue, the queue having a head, a tail, and a maximum number of allowed items;
  based, at least in part, on the cost estimate, dividing the query into a plurality of sub -queries;
  based, at least in part, on an item for the query reaching the head of the queue, causing a first sub-query of the plurality of sub-queries to be executed by the database management system; and
  based, at least in part, on determining there are more sub-queries of the plurality of sub -queries to be executed by the database management system:
    re-enqueuing an item for the query onto the tail of the queue if a current number of items in the queue is less than the maximum number of allowed items, or
    waiting until a current number of items in the queue is less than the maximum number of allowed items before re-enqueuing an item for the query onto the tail of the queue if a current number of items in the queue is not less than the maximum number of allowed items.

9. The method of claim 8, wherein the cost estimate is a number of query results the query is expected to return.

10. The method of claim 8, further comprising:
based, at least in part, on the determining there are more sub-queries of the plurality of sub-queries to be executed by the database management system, re-enqueuing an item for the query onto the tail of the queue.

11. The method of claim 8, further comprising:
based, at least in part, on the determining there are more sub-queries of the plurality of sub-queries to be executed by the database management system, waiting until a current number of items in the queue is less than the maximum number of allowed items before re-enqueuing an item for the query onto the tail of the queue.

12. The method of claim 8, wherein the first sub-query is configured with a result limiter that limits a number of results the first sub-query returns.

13. The method of claim 8, further comprising:
de-queueing an item for the query from the head of the queue; and
wherein the causing the first sub-query to be executed by the database management system is based, at least in part, on the de-queueing.

14. The method of claim 8, further comprising:
based, at least in part, on determining there are no more sub-queries of the plurality of sub-queries to be executed by the database management system, not re-enqueuing an item for the query onto the tail of the queue.

15. One or more non-transitory computer-readable media storing one or more one or more programs for execution by a computing system comprising one or more processors and storage media, the one or more programs comprising instructions configured for:
obtaining a query for execution by a database management system and a cost estimate for the database management system to execute the query;
enqueuing an item for the query onto a queue, the queue having a head, a tail, and a maximum number of allowed items;
based, at least in part, on the cost estimate, dividing the query into a plurality of sub-queries;
based, at least in part, on an item for the query reaching the head of the queue, causing a first sub-query of the plurality of sub-queries to be executed by the database management system; and
based, at least in part, on determining there are more sub-queries of the plurality of sub-queries to be executed by the database management system:

re-enqueuing an item for the query onto the tail of the queue if a current number of items in the queue is less than the maximum number of allowed items, or
waiting until a current number of items in the queue is less than the maximum number of allowed items before re-enqueuing an item for the query onto the tail of the queue if a current number of items in the queue is not less than the maximum number of allowed items.

16. The one or more non-transitory computer-readable media of claim 15, wherein the cost estimate is a number of query results the query is expected to return.

17. The one or more non-transitory computer-readable media of claim 15, the one or more programs comprising instructions configured for:
based, at least in part, on the determining there are more sub-queries of the plurality of sub-queries to be executed by the database management system, re-enqueuing an item for the query onto the tail of the queue.

18. The one or more non-transitory computer-readable media of claim 15, the one or more programs comprising instructions configured for:
based, at least in part, on the determining there are more sub-queries of the plurality of sub-queries to be executed by the database management system, waiting until a current number of items in the queue is less than the maximum number of allowed items before re-enqueuing an item for the query onto the tail of the queue.

19. The one or more non-transitory computer-readable media of claim 15, wherein the first sub-query is configured with a result limiter that limits a number of results the first sub-query returns.

20. The one or more non-transitory computer-readable media of claim 15, the one or more programs further comprising instructions configured for:
de-queueing an item for the query from the head of the queue; and
wherein the causing the first sub-query to be executed by the database management system is based, at least in part, on the de-queueing.

21. The one or more non-transitory computer-readable media of claim 15, the one or more programs further comprising instructions configured for:
based, at least in part, on determining there are no more sub-queries of the plurality of sub-queries to be executed by the database management system, not re-enqueuing an item for the query onto the tail of the queue.

* * * * *